(12) United States Patent
Sharif

(10) Patent No.: US 10,778,583 B2
(45) Date of Patent: Sep. 15, 2020

(54) CHAINED LONGEST PREFIX MATCHING IN PROGRAMMABLE SWITCH

(71) Applicant: Barefoot Networks, Inc., Santa Clara, CA (US)

(72) Inventor: Milad Sharif, Los Altos, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 15/927,663

(22) Filed: Mar. 21, 2018

(65) Prior Publication Data
US 2019/0280975 A1    Sep. 12, 2019

Related U.S. Application Data

(60) Provisional application No. 62/638,954, filed on Mar. 6, 2018.

(51) Int. Cl.
*H04L 12/745* (2013.01)
*H04L 12/743* (2013.01)
(Continued)

(52) U.S. Cl.
CPC .......... *H04L 45/748* (2013.01); *H04L 45/021* (2013.01); *H04L 45/48* (2013.01);
(Continued)

(58) Field of Classification Search
CPC ..... H04L 45/02; H04L 45/024; H04L 45/125; H04L 45/748; H04L 45/7457;
(Continued)

(56) References Cited

U.S. PATENT DOCUMENTS

| 8,848,707 B2 | 9/2014 | Assarpour |
| 9,647,941 B2 | 5/2017 | Sun |

(Continued)

OTHER PUBLICATIONS

Non-Published commonly owned International Patent Application PCT/US2019/020846, filed Mar. 5, 2019, 66 pages, Barefoot Networks, Inc.

(Continued)

*Primary Examiner* — Habte Mered
(74) *Attorney, Agent, or Firm* — Compass IP Law PC

(57) ABSTRACT

Some embodiments provide a method for configuring unit memories (e.g., unit static random access memories (SRAMs) and ternary content addressable memories (TCAMs) of a network forwarding IC to implement a set of longest prefix matching (LPM) tables. Two different methods of providing a longest prefix match (LPM) operation that minimize the use of ternary content addressable memory (TCAM) are presented. Each method takes advantage of the use of match-action stages and the programmability of the unit memories. An algorithmic LPM embodiment is presented which uses a TCAM index with pointers to SRAM partitions that store subtrees of a routing tree (routing trie structure) and performs subtree rearrangements in the partitions upon the addition of certain routing entries. A chained LPM embodiment, allocates separate exact-match tables for a set of address prefix lengths in, for example, SRAMS, as well as a set of non-exact match tables in, for example, TCAMs.

19 Claims, 28 Drawing Sheets

(51) Int. Cl.
*H04L 12/753* (2013.01)
*H04L 29/06* (2006.01)
*H04L 12/851* (2013.01)
*H04L 12/741* (2013.01)
*H04L 12/755* (2013.01)

(52) U.S. Cl.
CPC .......... *H04L 45/54* (2013.01); *H04L 45/7453* (2013.01); *H04L 45/7457* (2013.01); *H04L 47/2483* (2013.01); *H04L 69/22* (2013.01)

(58) Field of Classification Search
CPC ..... H04L 45/54; H04L 45/7453; H04L 47/17; H04L 61/6095; H04L 45/021; H04L 45/48; G06F 16/90339
See application file for complete search history.

(56) References Cited

U.S. PATENT DOCUMENTS

| | | | |
|---|---|---|---|
| 9,704,574 B1* | 7/2017 | Shamis | G11C 15/04 |
| 9,979,651 B2* | 5/2018 | Labonte | H04L 45/748 |
| 2003/0023581 A1 | 1/2003 | Davis et al. | |
| 2008/0112412 A1 | 5/2008 | Pong | |
| 2010/0265849 A1 | 10/2010 | Harel | |
| 2013/0031077 A1* | 1/2013 | Liu | G06F 7/02 |
| | | | 707/706 |
| 2014/0328180 A1* | 11/2014 | Kim | H04L 47/21 |
| | | | 370/235.1 |
| 2014/0334489 A1* | 11/2014 | Bosshart | H04L 47/56 |
| | | | 370/392 |
| 2015/0092778 A1* | 4/2015 | Jackson | H04L 67/2842 |
| | | | 370/392 |
| 2015/0143136 A1 | 5/2015 | Barney et al. | |
| 2015/0341307 A1* | 11/2015 | Page | H04L 69/22 |
| | | | 370/392 |
| 2016/0182372 A1* | 6/2016 | Holbrook | H04L 45/748 |
| | | | 370/392 |
| 2016/0254999 A1* | 9/2016 | Labonte | H04L 45/748 |
| | | | 370/392 |
| 2017/0063690 A1 | 3/2017 | Bosshart | |
| 2017/0064047 A1* | 3/2017 | Bosshart | H04L 69/22 |
| 2017/0237662 A1* | 8/2017 | Labonte | H04L 45/748 |
| | | | 370/392 |
| 2018/0241673 A1* | 8/2018 | Labonte | H04L 45/748 |

OTHER PUBLICATIONS

Zane, Francis, et al., "CoolCAMs: Power-Efficient TCAMs for Forwarding Engines," IEEE INFOCOM 2003, Twenty-second Annual Joint Conference of the IEEE Computer and Communications Societies. Mar. 30-Apr. 3, 2003, 11 pages, vol. 1, INFOCOM, San Francisco, California, USA.

Non-Published commonly Owned U.S. Appl. No. 15/921,684, filed Mar. 21, 2018, 67 pages, Barefoot Networks, Inc.

Notice of Allowance for U.S. Appl. No. 15927684, dated May 1, 2019, 10 pages.

PCT International Search Report and Written Opinion of Commonly owned International Patent Application PCT/US20191/020846, dated Jun. 14, 2019, 17 pages, International Searching Authority 9EPO).

* cited by examiner

CHAINED LONGEST PREFIX MATCHING IN PROGRAMMABLE SWITCH

BACKGROUND

Longest prefix matching is a common feature of many switching applications. Using types of memory that rely on standard lookups can require tables that are prohibitively large and can take too much time to search. Using memory types that can perform ternary lookups allowing for wildcard values can consume too much power. Therefore, an improved architecture and method are required to improve the function of longest prefix matching in a switch.

BRIEF SUMMARY

Some embodiments provide a method for configuring unit memories (e.g., unit static random access memories (SRAMs) and ternary content addressable memories (TCAMs) of a network forwarding IC to implement a set of longest prefix matching (LPM) tables. An algorithmic LPM (ALPM) embodiment creates a set of partitions in a set of unit memories of a first type of memory (e.g., SRAM). A limit on the number of subtrees of a routing trie that can be placed in each partition is defined. In some embodiments, the routing trie corresponds to a routing table for which the LPM operation is to be performed. The method defines an initial distribution of the routing trie (routing table) entries among the different partitions based on a post order search of the routing trie for nodes meeting certain criteria related to the number of entries the partition can hold. The ALPM embodiment also stores a set of root node prefixes and pointers in a set of unit memories of a second type of memory (e.g., TCAM) which allows searching using wildcard ("don't care") bits. A limited amount of memory space can be designated in each type of memory based on expectations for routing table size, the size of the partitions, and the number of subtree allowed per partition. For each type of memory, the designated space is stored in a single unit memory, in some embodiments, or across multiple unit memories in other embodiments.

During runtime, additional entries may be added to the routing table (routing trie). Routing entries that are able to be stored in the trie structure without overflowing the partition storing the subtree (subtrie) to which the added entry belongs are stored in the partition. However, if adding the entry to the partition storing the subtree (subtrie) to which the added entry belongs will cause the partition to overflow, the method performs a rearrangement operation (e.g., either swaps or moves the overflowing subtree).

In some embodiments, a swapping operation includes copying one of the swappable subtrees to an available partition, updating the pointer to the root node of the copied subtree, and then deleting the subtree from its original partition. The swapped subtree is then copied to the original location of the other subtree, its root node pointer is updated, and the swapped subtree is deleted from its original partition. Finally, the first subtree is copied to the original position of the other subtree, its pointer is updated again, and it is deleted from the available partition. This method more efficiently uses space in partially-full partitions while maintaining empty partitions for subsequently added entries (or subtrees including the subsequently-added entries) that require an entire partition. In some embodiments, a confirmation is sent between each copy, update, and delete operation to ensure that traffic flow is not disrupted.

In some embodiments, a moving operation includes copying an overflowing subtree to an available partition, updating the pointer to the root node of the copied subtree, and then deleting the subtree from its original partition. In some embodiments, a confirmation is sent between each copy, update, and delete operation to ensure that traffic flow is not disrupted.

Deleting operations, in some embodiments, are provided to delete entries from the routing trie. For deleted non-root nodes, the entry for the deleted node in the subtree is simply removed from the partition storing the deleted node. No pointers need to be updated because the non-root node does not have an entry in the second memory type. For root node deletions, covering nodes/prefixes (i.e., a most-recent ancestor in the routing trie that has a valid node) are added to the partition if the subtree still contains valid nodes. If the deleted root node is the only node left in its subtree, the root node is simply deleted if it cannot be merged with a child subtree without causing overflow, in some embodiments. A deleted root node, in some embodiments, is merged with a child subtree by adding the covering prefix for the deleted root node.

The configured switch can then be used to perform LPM operations by searching through the second type of memory (e.g., TCAM) for the root node prefixes using a single parallel search to identify the LPM for an incoming data message (packet). The identified LPM then identifies a partition containing the root node that corresponds to the LPM which his searched for a rule or action associated with the routing entry.

As an alternative to ALPM, the switch architecture supports a chained longest prefix matching (CLPM) that makes use of more SRAMs and uses less or no TCAMs. This is in contrast to a standard switch, which has a fixed LPM pipeline that uses a single large TCAM or a specific configuration of TCAMs and SRAMs. Some embodiments provide a method for configuring a switch to perform a longest prefix matching operation using a set of exact-match tables that can be implemented in SRAM. In some embodiments, a non-exact-match table is implemented in TCAM to ensure that there are no holes in the routing table. In some embodiments a controller of a switch configures the switch to perform CLPM.

In a CLPM embodiment, a set of exact-match and non-exact match tables are allocated that are then populated with routing entries from a routing table. Exact-match tables store routing entries for address prefixes of a particular length, while non-exact match tables store address prefixes of a plurality of lengths. In some embodiments, tables for address prefixes of longer lengths are stored in a same or previous stage in a switch's processing pipeline than tables for address prefixes of shorter lengths to allow the switch to bypass the shorter prefix length tables when a match is found in a table for longer prefix lengths. A CLPM embodiment processes a received data message by comparing a field or packet header vector generated from the packet (or data message) header to the addresses stored in the separate tables and outputs the longest matching prefix.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for configuring unit memories (e.g., unit static random access memories (SRAMs) and ternary content addressable memories (TCAMs) of a network forwarding IC to implement a set of longest prefix matching (LPM) tables.

Figure 1:
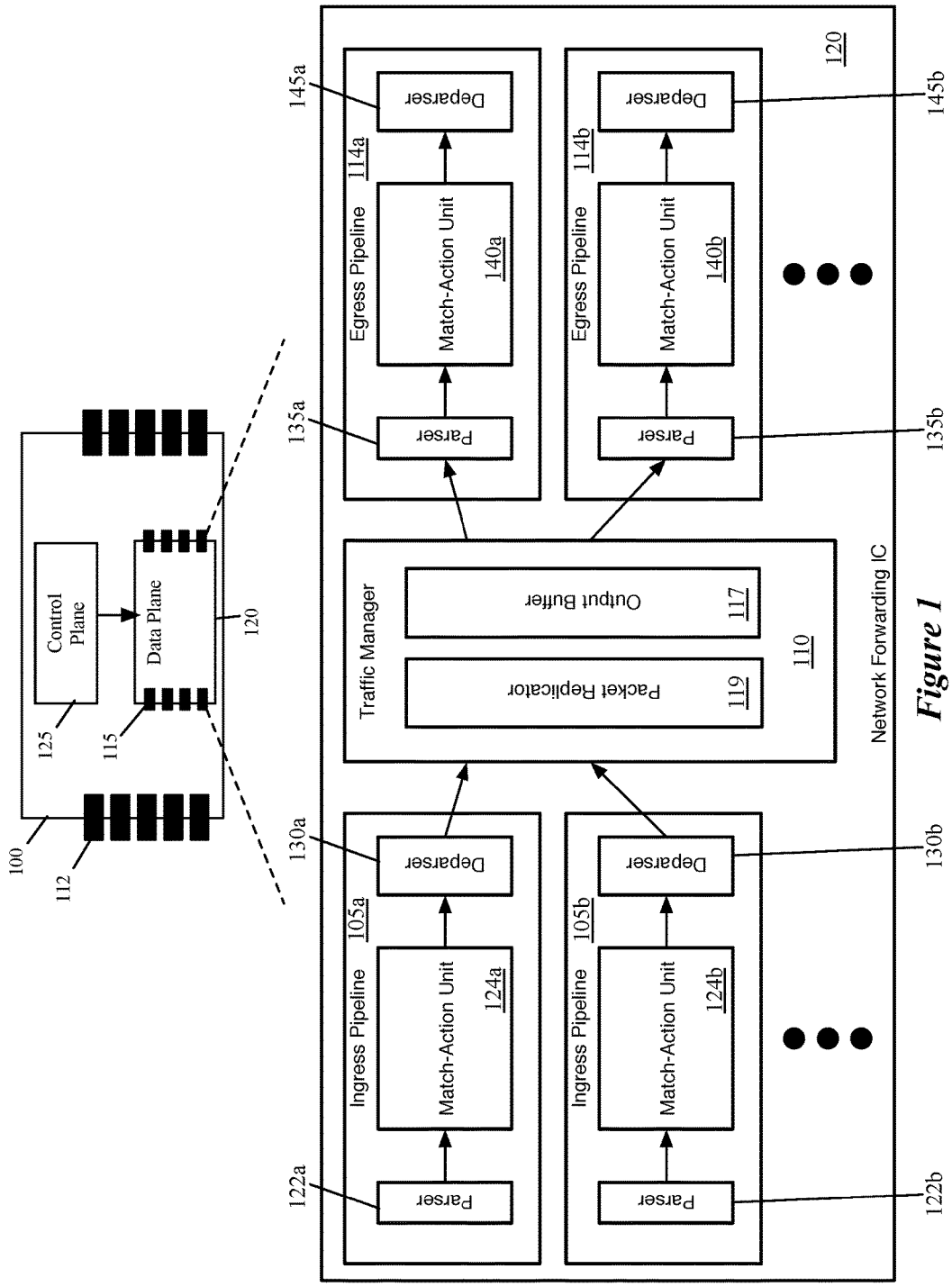
FIG. 1 conceptually illustrates an example of a forwarding element 100 of some embodiments that is used to forward data messages in a network.

FIG. 1 illustrates an example of a forwarding element 100 of some embodiments that is used to forward data messages in a network. This forwarding element can be any type of forwarding element, such as a switch, a router, a bridge, etc. Also, this forwarding element can be deployed at an edge of the network to connect directly to host computers and/or standalone computers, or it can be deployed as a non-edge forwarding element in the interior of the network. The non-edge forwarding element forwards data messages between forwarding elements in the network (i.e., through intervening network fabric), while the edge forwarding element forwards data messages to and from edge compute device to each other, to other edge forwarding elements and/or to non-edge forwarding elements.

As shown, the forwarding element 100 includes a data plane circuit 120 (the "data plane"), a control plane circuit 125 (the "control plane"), and physical ports 112. The physical ports receive data messages from, and transmit data messages to, devices outside of the forwarding element 100. In some embodiments, the control plane 125 is implemented by one or more general purpose central processing units (CPUs), while the data plane 120 of the forwarding element is implemented by an application specific integrated circuit (ASIC) that is custom made to perform the data plane operations.

The data plane 120 performs the forwarding operations of the forwarding element 100 to forward data messages received by the forwarding element to other devices, while the control plane 125 configures the data plane. The data plane 120 also includes ports 115 that receive data messages to process and transmit data messages after they have been processed. In some embodiments, some ports 115 of the data plane 120 are associated with the physical ports 112 of the forwarding element 100, while other ports 115 are associated with other modules of the control plane 125 and/or data plane 120.

The data plane includes several pipelines of configurable message-processing (MP) stages that can be configured to perform the data plane forwarding operations of the forwarding element to process and forward data messages to their destinations. These message-processing stages perform these forwarding operations by processing data tuples associated with the data messages received by the forwarding element, in order to determine how to forward the messages. In some embodiments, these data tuples are header vectors generated from the headers of the messages. Also, in some embodiments, the message-processing stages include match action units (MAUs) that try to match data tuples (e.g., values from the header vectors) of messages with table records that specify actions to perform on the data tuples.

FIG. 1 also conceptually illustrates additional structure of a data plane (network forwarding IC) 120 of some embodiments (that is, e.g., incorporated into a hardware forwarding element). Specifically, FIG. 1 illustrates several ingress pipelines 105, a traffic management unit (referred to as a traffic manager) 110, and several egress pipelines 114. Though shown as separate structures, in some embodiments the ingress pipelines 105 and the egress pipelines 114 actually use the same circuitry resources. In some embodiments, the pipeline circuitry is configured to handle both ingress and egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

Generally, when the network forwarding IC 120 receives a packet, in some embodiments the packet is directed to one of the ingress pipelines 105 (each of which may correspond to one or more ports of the hardware forwarding element). After passing through the selected ingress pipeline 105, the packet is sent to the traffic manager 110, where the packet is enqueued and placed in the output buffer 117. In some embodiments, the ingress pipeline 105 that processes the packet specifies into which queue the packet should be placed by the traffic manager 110 (e.g., based on the destination of the packet). The traffic manager 110 then dispatches the packet to the appropriate egress pipeline 114 (each of which may correspond to one or more ports of the forwarding element). In some embodiments, there is no necessary correlation between which of the ingress pipelines 105 processes a packet and to which of the egress pipelines 114 the traffic manager 110 dispatches the packet. That is, a packet might be initially processed by ingress pipeline 105b after receipt through a first port, and then subsequently by egress pipeline 114a to be sent out a second port, etc.

Each ingress pipeline 105 includes a parser 122, a match-action unit (MAU) 124, and a deparser 130. Similarly, each egress pipeline 114 includes a parser 135, a MAU 140, and a deparser 145. The parser 122 or 135, in some embodiments, receives a packet as a formatted collection of bits in a particular order, and parses the packet into its constituent header fields. The parser starts from the beginning of the packet and assigns these header fields to fields (e.g., data containers) of a packet header vector (PHV) for processing. In some embodiments, the parser 122 or 135 separates out the packet headers (up to a designated point) from the payload of the packet, and sends the payload (or the entire packet, including the headers and payload) directly to the deparser without passing through the MAU processing (e.g., on a single wire).

The MAU 124 or 140 performs processing on the packet data (i.e., the PHV). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU. The MAU stages are described in more detail below by reference to FIG. 2.

The deparser 130 or 145 reconstructs the packet using the PHV as modified by the MAU 124 or 140 and the payload received directly from the parser 122 or 135. The deparser constructs a packet that can be sent out over the physical network, or to the traffic manager 110. In some embodiments, the deparser constructs this packet based on data received along with the PHV that specifies the protocols to include in the packet header, as well as its own stored list of data container locations for each possible protocol's header fields.

The traffic manager 110, as shown, includes a packet replicator 119 and the previously-mentioned output buffer 117. In some embodiments, the traffic manager 110 may include other components, such as a feedback generator for sending signals regarding output port failures, a series of queues and schedulers for these queues, queue state analysis components, as well as additional components. The packet replicator 119 of some embodiments performs replication for broadcast/multicast packets, generating multiple packets to be added to the output buffer (e.g., to be distributed to different egress pipelines).

The output buffer 117 is part of a queuing and buffering system of the traffic manager in some embodiments. The traffic manager 110 provides a shared buffer that accommodates any queuing delays in the egress pipelines. In some embodiments, this shared output buffer 117 stores packet data, while references (e.g., pointers) to that packet data are kept in different queues for each egress pipeline 114. The egress pipelines request their respective data from the common data buffer using a queuing policy that is control-plane configurable. When a packet data reference reaches the head of its queue and is scheduled for dequeuing, the corresponding packet data is read out of the output buffer 117 and into the corresponding egress pipeline 114. In some embodiments, packet data may be referenced by multiple pipelines (e.g., for a multicast packet). In this case, the packet data is not removed from this output buffer 117 until all references to the packet data have cleared their respective queues.

Figure 2:
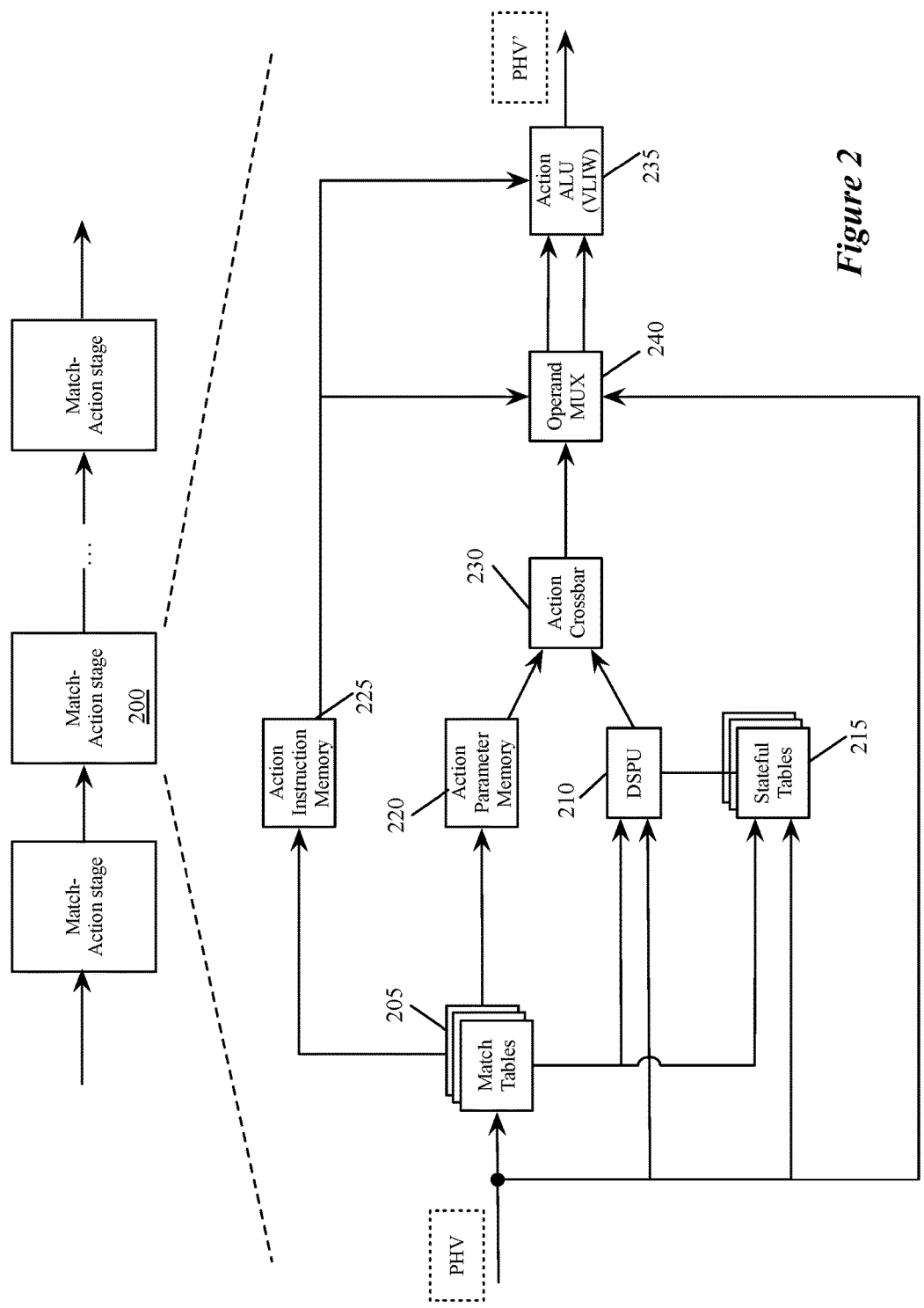
FIG. 2 illustrates an example of a match-action unit of some embodiments.

FIG. 2 illustrates an example of a match-action unit of some embodiments. As mentioned above, a packet processing pipeline of some embodiments has several MAU stages, each of which includes packet-processing circuitry for forwarding received data packets and/or performing stateful operations based on these data packets. These operations are performed by processing values stored in the PHVs (i.e., the primary PHVs) of the packets.

As shown in FIG. 2, the MAU stage 200 in some embodiments has a set of one or more match tables 205, a data plane stateful processing unit 210 (DSPU), a set of one or more stateful tables 215, an action crossbar 230, an action parameter memory 220, an action instruction memory 225, and an action engine 235. The match table set 205 can compare one or more fields in a received PHV to identify one or more matching flow entries (i.e., entries that match the PHV). The match table set can be TCAM tables or exact match tables in some embodiments. In some embodiments, the match table set can be accessed at an address that is a value extracted from one or more fields of the PHV, or it can be a hash of this extracted value.

In some embodiments, the value stored in a match table record that matches a packet's flow identifier, or that is accessed at a hash-generated address, provides addresses for the action parameter memory 220 and action instruction memory 225. Also, such a value from the match table can provide an address and/or parameter for one or more records in the stateful table set 215, and can provide an instruction and/or parameter for the DSPU 210. As shown, the DSPU 210 and the stateful table set 215 also receive a processed PHV. The PHVs can include instructions and/or parameters for the DSPU, while containing addresses and/or parameters for the stateful table set 215.

The DSPU 210 in some embodiments performs one or more stateful operations, while a stateful table 215 stores state data used and generated by the DSPU 210. Though shown as a single DSPU 210, in some embodiments this may represent multiple DSPUs within a match-action stage. For example, some embodiments include two DSPUs and two stateful tables. In some embodiments, the DSPU includes one or more programmable arithmetic logic unit (ALUs) that perform operations synchronously with the dataflow of the packet-processing pipeline (i.e., synchronously at the line rate). As such, the DSPU can process a different PHV on every clock cycle, thus ensuring that the DSPU would be able to operate synchronously with the dataflow of the packet-processing pipeline. In some embodiments, a DSPU performs every computation with fixed latency (e.g., fixed number of clock cycles). In some embodiments, the local or remote control plane provides configuration data to program a DSPU.

The DSPU 210 outputs a set of action parameters to the action crossbar 230. The action parameter memory 220 also outputs a set of action parameters to this crossbar 230. The action parameter memory 220 retrieves the action parameter that it outputs from its record that is identified by the address provided by the match table set 205. The action crossbar 230 in some embodiments maps the action parameters received from the DSPU 210 and action parameter memory 220 to an action parameter bus 240 of the action engine 235. This bus provides the set of action parameters to this engine 235. For different data packets, the action crossbar 230 can map the action parameters from DSPU 210 and memory 220 differently to this bus 240. The crossbar can supply the action parameters from either of these sources in their entirety to this bus 240, or it can concurrently select different portions of these parameters for this bus.

The action engine 235 also receives a set of instructions to execute from the action instruction memory 225. This memory 225 retrieves the instruction set from its record that is identified by the address provided by the match table set 205. The action engine 235 also receives the PHV for each packet that the MAU processes. Such a PHV can also contain a portion or the entirety of a set of instructions to process and/or a set of parameters for processing the instruction.

The action engine 235 in some embodiments includes a parameter multiplexer and a very large instruction word (VLIW) processor, which is a set of one or more ALUs. In some embodiments, the parameter multiplexer receives the parameter sets from the action crossbar 230 and input PHV and outputs the parameters as operands to the VLIW processor according to the instruction set (from the instruction memory 235 or the PHV. The VLIW processor executes instructions (from the instruction memory 235 or the PHV) applied to the operands received from the parameter multiplexer. The action engine 235 stores the output of its operation in the PHV in order to effectuate a packet forwarding operation and/or stateful operation of its MAU stage 200. The output of the action engine 235 forms a modified PHV (PHV') for the next MAU stage.

In other embodiments, the match tables 205 and the action tables 215, 220 and 225 of the MAU stage 200 can be accessed through other methods as well. For instance, in some embodiments, each action table 215, 220 or 225 can be addressed through a direct addressing scheme, an indirect addressing scheme, and an independent addressing scheme. The addressing scheme that is used depends on the configuration of the MAU stage, which in some embodiments, is fixed for all data packets being processed, while in other embodiments can be different for different packets being processed.

In the direct addressing scheme, the action table uses the same address that is used to address the matching flow entry in the match table set 205. As in the case of a match table 205, this address can be a hash generated address value or a value from the PHV. Specifically, the direct address for an action table can be a hash address that a hash generator (not shown) of the MAU generates by hashing a value from one or more fields of the PHV. Alternatively, this direct address can be a value extracted from one or more fields of the PHV.

On the other hand, the indirect addressing scheme accesses an action table by using an address value that is extracted from one or more records that are identified in the match table set 205 for a PHV. As mentioned above, the match table records are identified through direct addressing or record matching operations in some embodiments.

The independent address scheme is similar to the direct addressing scheme except that it does not use the same address that is used to access the match table set 205. Like the direct addressing scheme, the table address in the independent addressing scheme can either be the value extracted from one or more fields of the PHV, or it can be a hash of this extracted value. In some embodiments, not all of the action tables 215, 220 and 225 can be accessed through these three addressing schemes. For example, in some embodiments, some of the memories are accessible only through the direct and indirect addressing schemes.

In some embodiments, each match-action stage 200 of a processing pipeline of some embodiments has the ability to run an ingress thread for processing an ingress packet and an egress thread for processing an egress packet. For each clock cycle, each MAU stage runs either both an ingress and egress thread, one or the other, or neither, depending on whether ingress and/or egress packets are provided to the stage (e.g., in the PHV) for that cycle. In addition, some embodiments provide the ability to run one or more additional threads for processing non-packet data. In some embodiments, this non-packet thread is a third thread that is tied to the ingress thread. That is, a set of PHV data containers allocated to the non-packet data have the same timing as the ingress PHV (if one is present) through the match-action stages, which are configured to execute both the ingress and non-packet threads. As the match-action resources are configurable, an administrator can configure the ingress and egress processing as well as the non-packet processing in some embodiments, such that each of these threads are effectively running different programs composed by the administrator, using different resources of the pipeline (e.g., different memory units, PHV containers, etc.). In other embodiments, the non-packet thread is tied to the egress thread, or non-packet threads may be tied to both ingress and egress threads.

Figure 3:
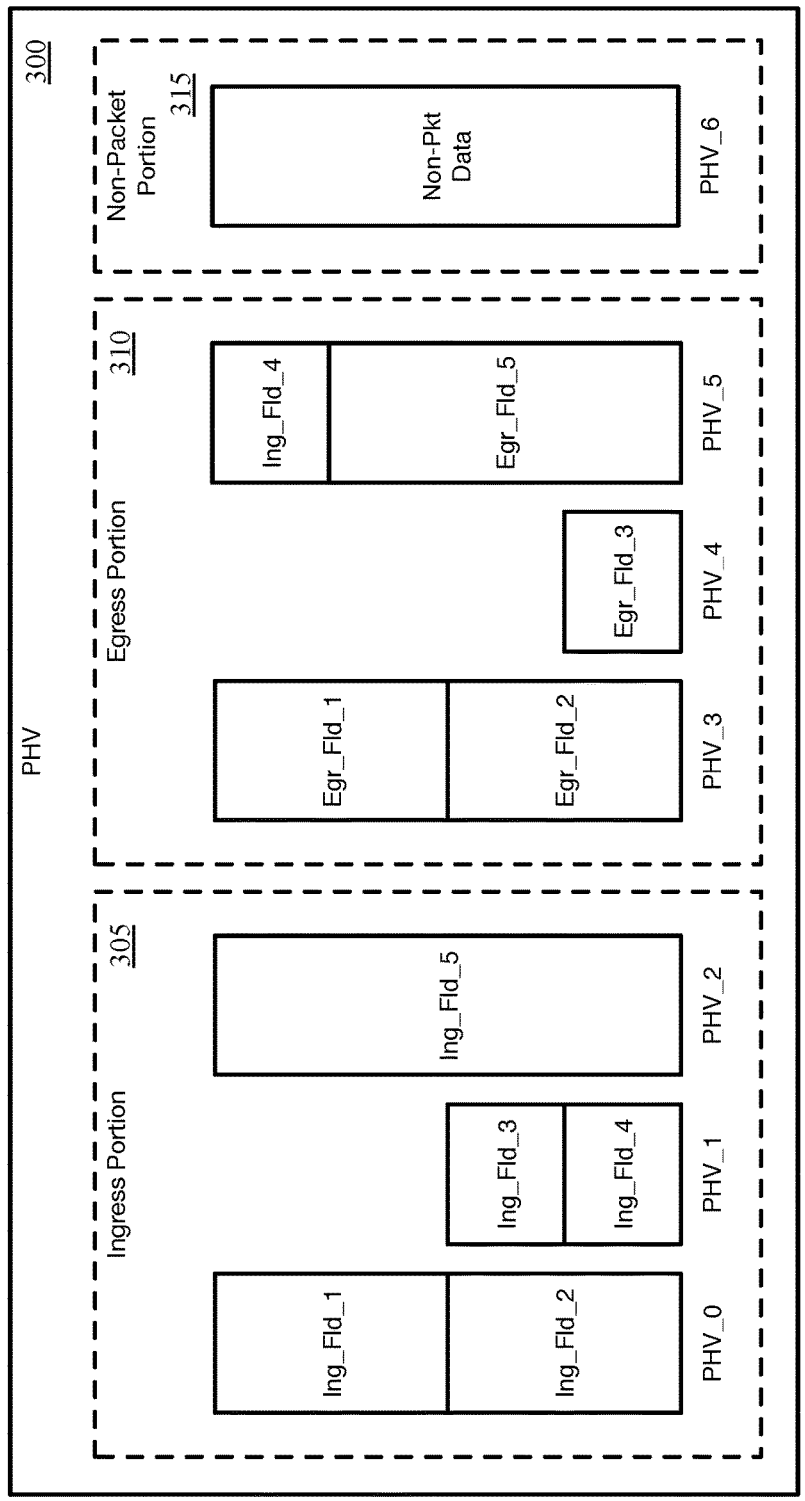
FIG. 3 conceptually illustrates an example packet header vector that would be output by a parser of some embodiments.

FIG. 3 conceptually illustrates an example PHV 300 that would be output by a parser of some embodiments. This PHV 300, as shown, includes an ingress portion 305, an egress portion 310, and a non-packet portion 315. In this example, the ingress portion 305 and egress portion 310 have only three data containers each, and it should be understood that a typical PHV will have significantly more data allocated for storing packet header fields and associated data. In some embodiments, an administrator allocates the PHV resources between the ingress packet thread, egress packet thread, and non-packet portion. In other embodiments, the ingress portion and egress portion are fixed for a particular network forwarding IC, with the non-packet data allocated within the ingress portion by the administrator.

On each clock cycle, the parser can output a PHV 300, with any combination of the three portions 305-315 having data to be processed by the MAU. Portions that do not store any data are zeroed out in some embodiments, or otherwise indicated to not be carrying data. If either the egress portion 310 or the combination of the ingress and non-packet portions 305 and 315 are not storing data for a particular clock cycle, some embodiments save power by pointing the thread for that portion to the end of the pipeline.

Figure 13:
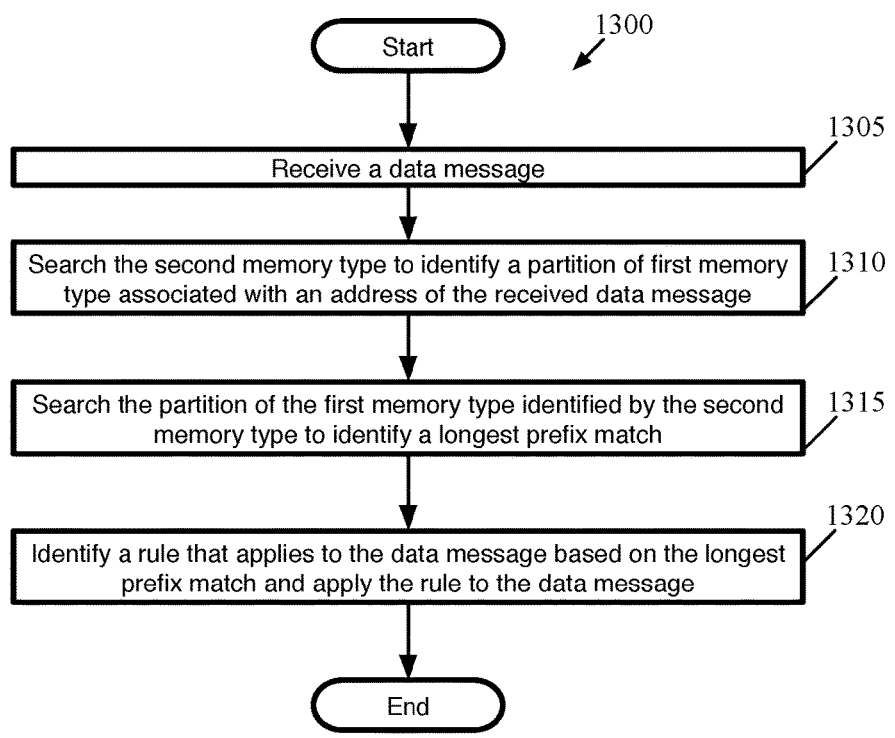
FIG. 13 conceptually illustrates a process for using the memories programmed through the process described in FIG. 4 and maintained through processes described in FIGS. 6, 8, 10, and 12.
Figure 14:
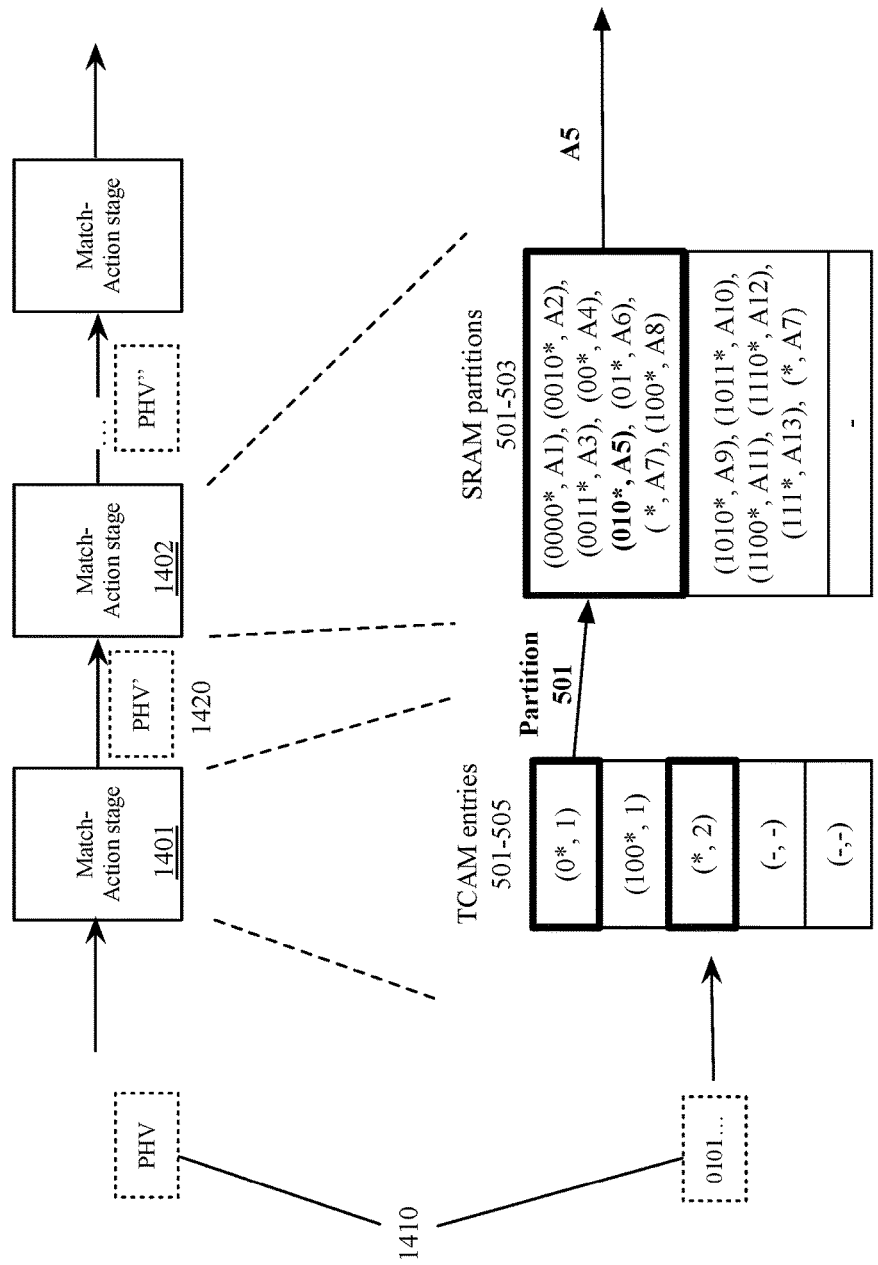
FIG. 14 illustrates a simplified view of a series of match action stages implementing the process described in FIG. 13.
Figure 15:
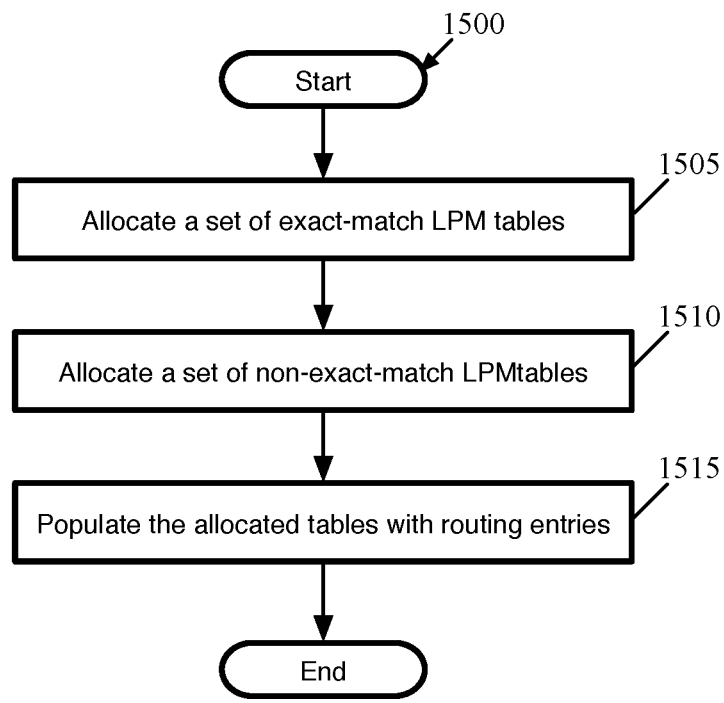
FIG. 15 conceptually illustrates a process for configuring a switch to perform a longest prefix matching operation using a set of exact-match tables that can be implemented in SRAM.
Figure 16:
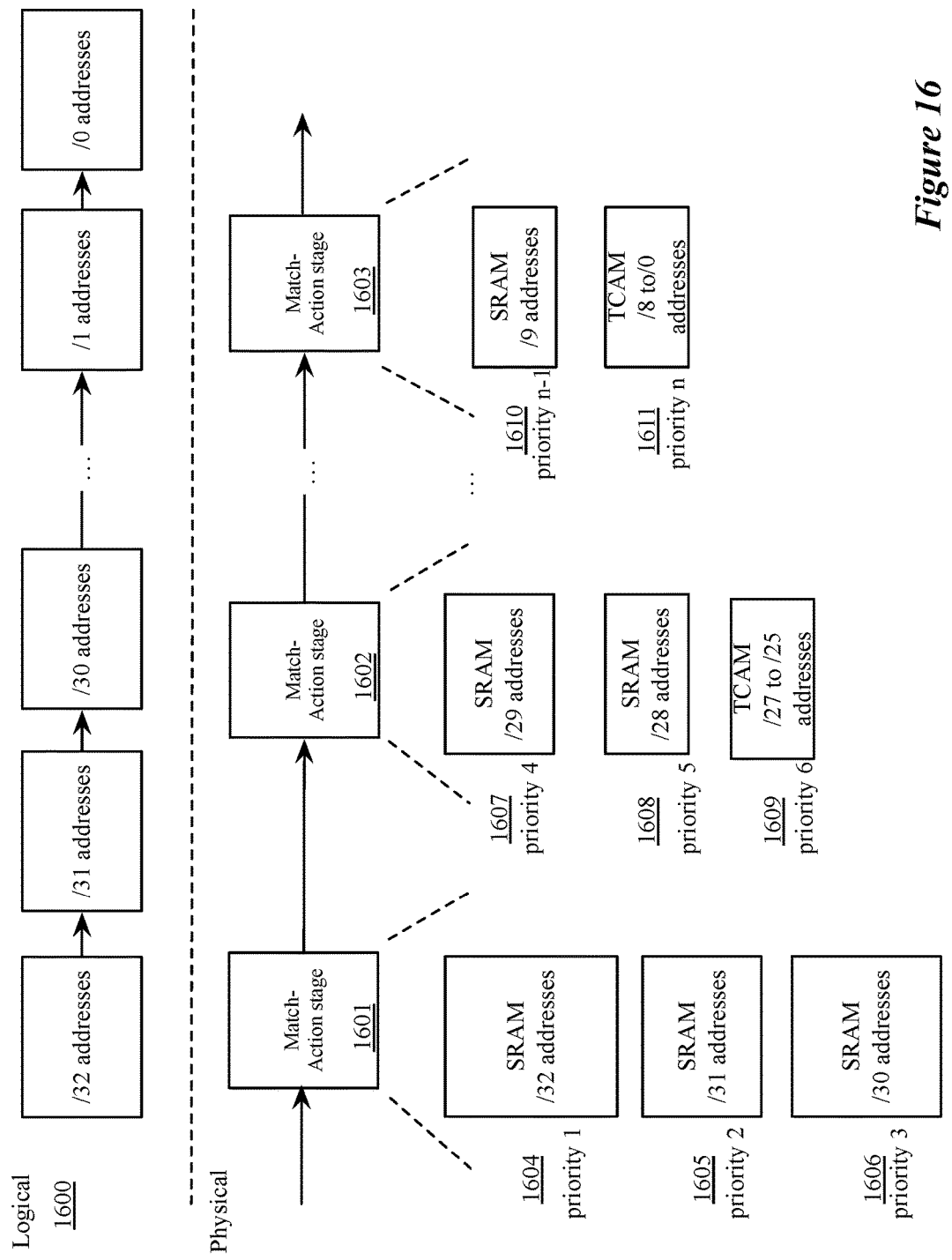
FIG. 16 illustrates an exemplary embodiment of a series of match-action stages configured by the process described in FIG. 15.
Figure 17:
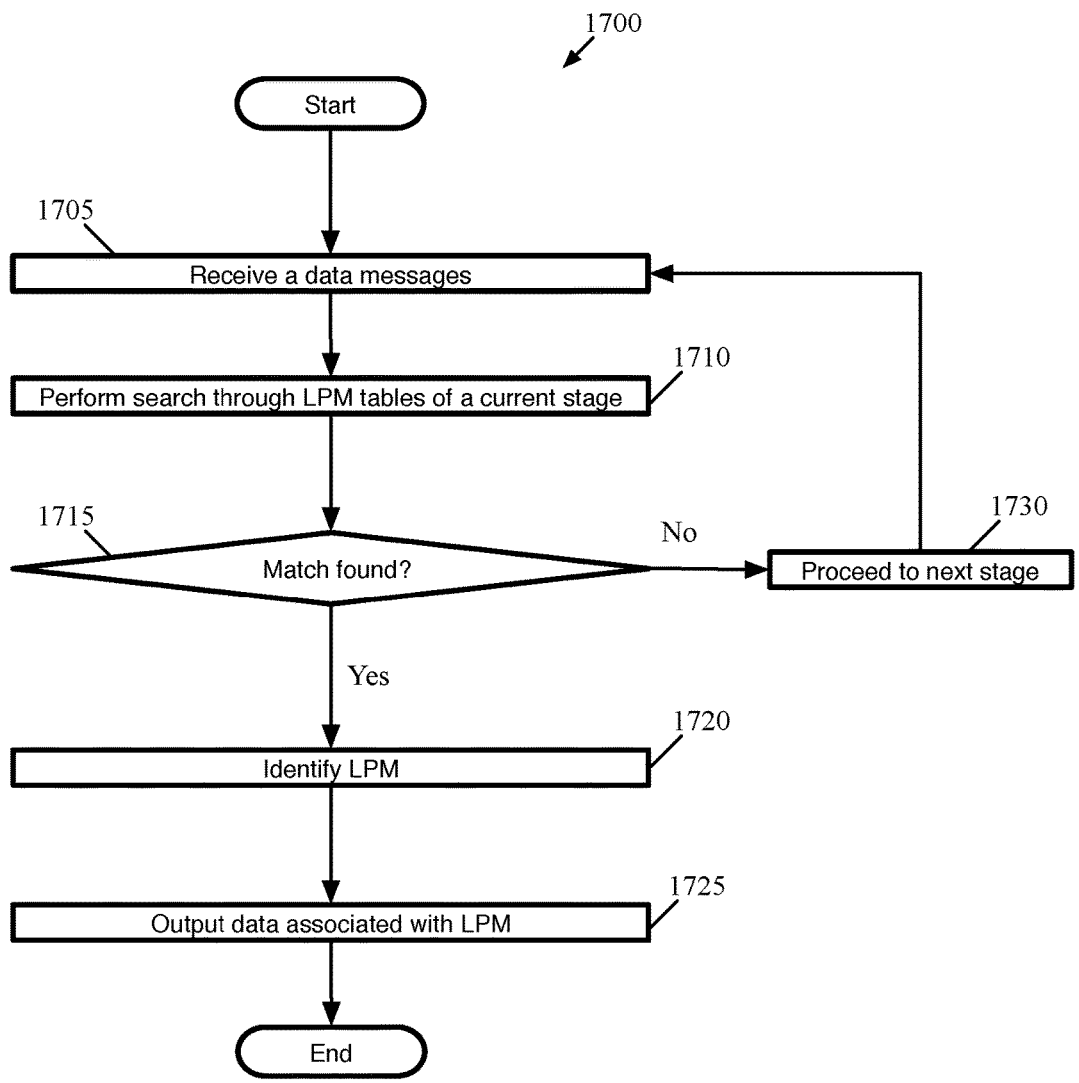
FIG. 17 conceptually illustrates a process 1700 for using exact-match and non-exact-match LPM tables allocated and populated using the process described in FIG. 15.

For the forwarding IC described in reference to FIGS. 1-3, some embodiments provide a method for configuring tables stored in the match-action stages to perform a longest prefix match. Two different methods of providing a longest prefix match (LPM) operation that minimize the use of ternary content addressable memory (TCAM) are presented below in reference to FIGS. 4-14 and FIGS. 15-17. FIGS. 4-14 are relevant to an algorithmic LPM (ALPM) method of utilizing TCAM and random access memory (RAM) such as stationary RAM (SRAM) together to perform a longest prefix matching operation that consumes less power than using only TCAM. FIGS. 15-17 are relevant to a method of performing a chained LPM (CLPM) that replaces most TCAM tables/entries with a series of SRAM tables/entries that reduce the use of TCAM and also conserve power compared to performing an LPM operation using TCAM. In some embodiments of the ALPM or CLPM implementation, an output of a first MAU stage is contained in a modified PHV (e.g., PHV') that is passed to a subsequent MAU stage.

Figure 4:
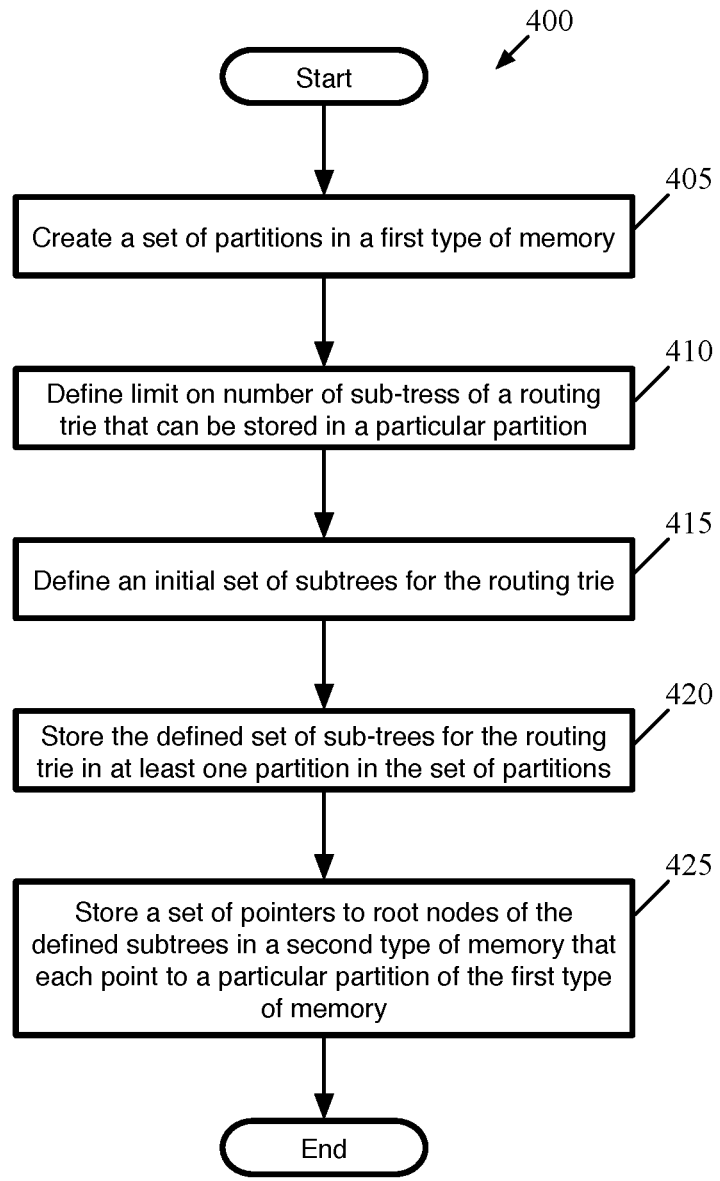
FIG. 4 conceptually illustrates a process for storing routing table entries in a set of memory partitions in multiple different types of memory for an ALPM embodiment.

FIG. 4 conceptually illustrates a process 400 for storing routing table entries in a set of memory partitions in multiple different types of memory for an ALPM embodiment. In some embodiments, process 400 is performed by a switch comprising the different types of memories. A controller directs the switch to perform process 400, in some embodiments, based on a set of instructions provided by a user (e.g., a switch program written by a user that is compiled to be implemented on the switch). The process begins (at 405) by creating a set of partitions in a first type of memory. In some embodiments, the first type of memory is a random access memory (RAM) (e.g., static RAM (SRAM)). The partitions, in some embodiments, are all of a same size (i.e., are all configured to store a same number of routing entries). In other embodiments, one or more partitions may be of a different size (e.g., a single partition that is half the size of the other partitions to accommodate a set of routing entries that are being transferred from one partition to another). A user, in some embodiments, specifies the size of the partitions (e.g., the amount of memory allocated to the partition) based on the number of routing entries that the user expects to be necessary. The partition size ("B"), in some embodiments, is also chosen to limit the number of entries in a second type of memory (e.g., TCAM). For example, if a user expects 120K-200K routing entries to be stored in SRAM, and would like to use a maximum of 2000 TCAM entries, the user might specify a partition size of 500 entries with a maximum number of subtrees per partition equal to 4, to allow the 200K routing entries to be stored in 500, 80%-filled partitions so that the total number of pointers stored in the TCAM is a maximum of 2000 (500 partitions with 4 subtree pointers maximum). In some embodiments, a user will not specify the total number of partitions, but as described above can set the configurable parameters to match the user's expectations.

The process continues (at 410) by defining a limit on the number of subtrees that can be stored in a given partition. In some embodiments, the limit on the number of subtrees prevents the number of pointers to roots of the subtrees in the partition from growing too large. In some embodiments, a routing trie is constructed from a routing table. Each node in the routing trie corresponds to a unique prefix (that may not appear in the routing table) and is associated with three pieces of state data: (1) whether the prefix appears in the routing table (is a valid prefix), (2) the count of the node, i.e., the number of valid prefixes included in the subtree below the node (inclusive of the node itself), and (3) whether the node is a root node of a subtree.

Figure 5A:
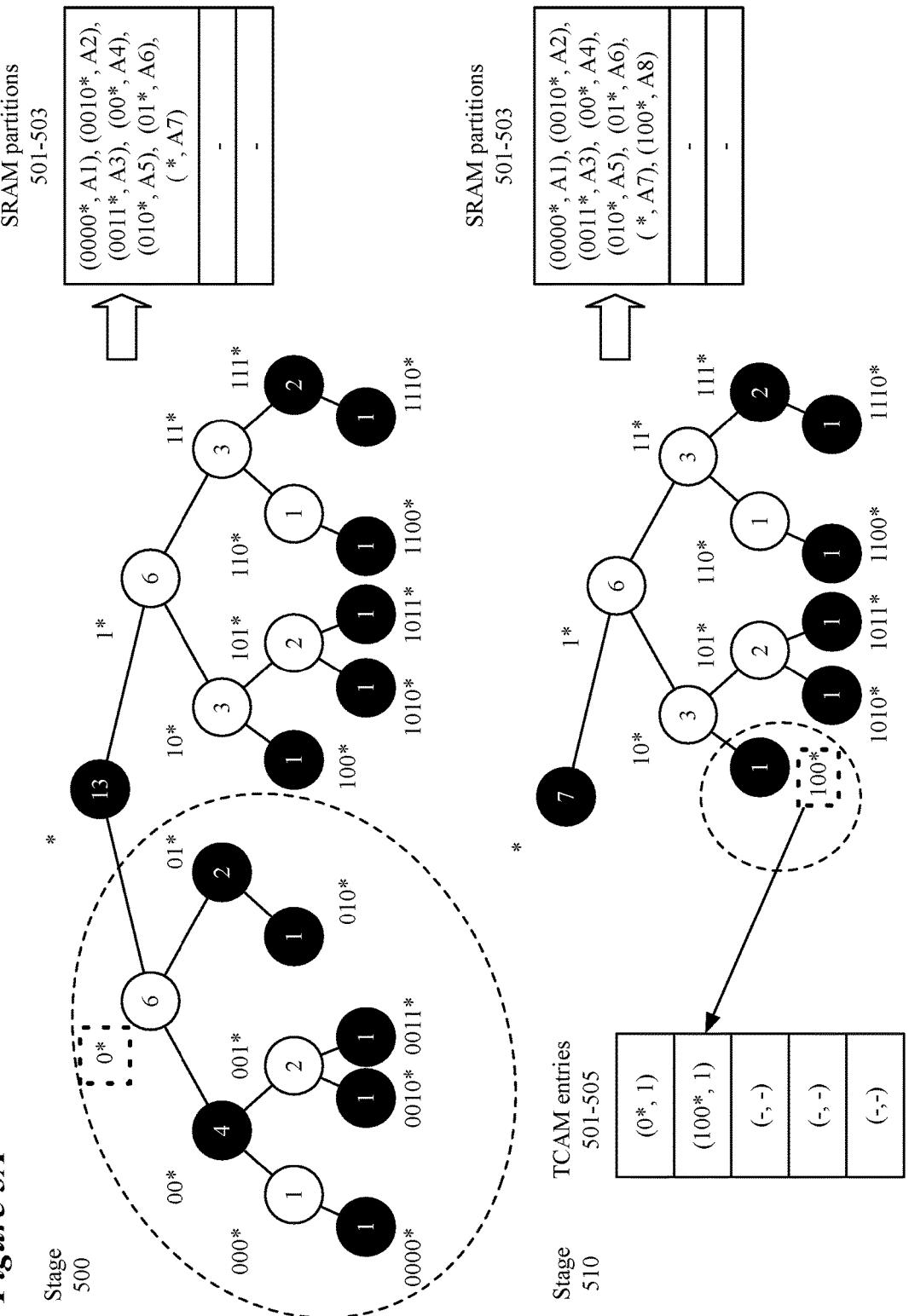
FIGS. 5A-B illustrate an exemplary routing trie division.
Figure 5B:
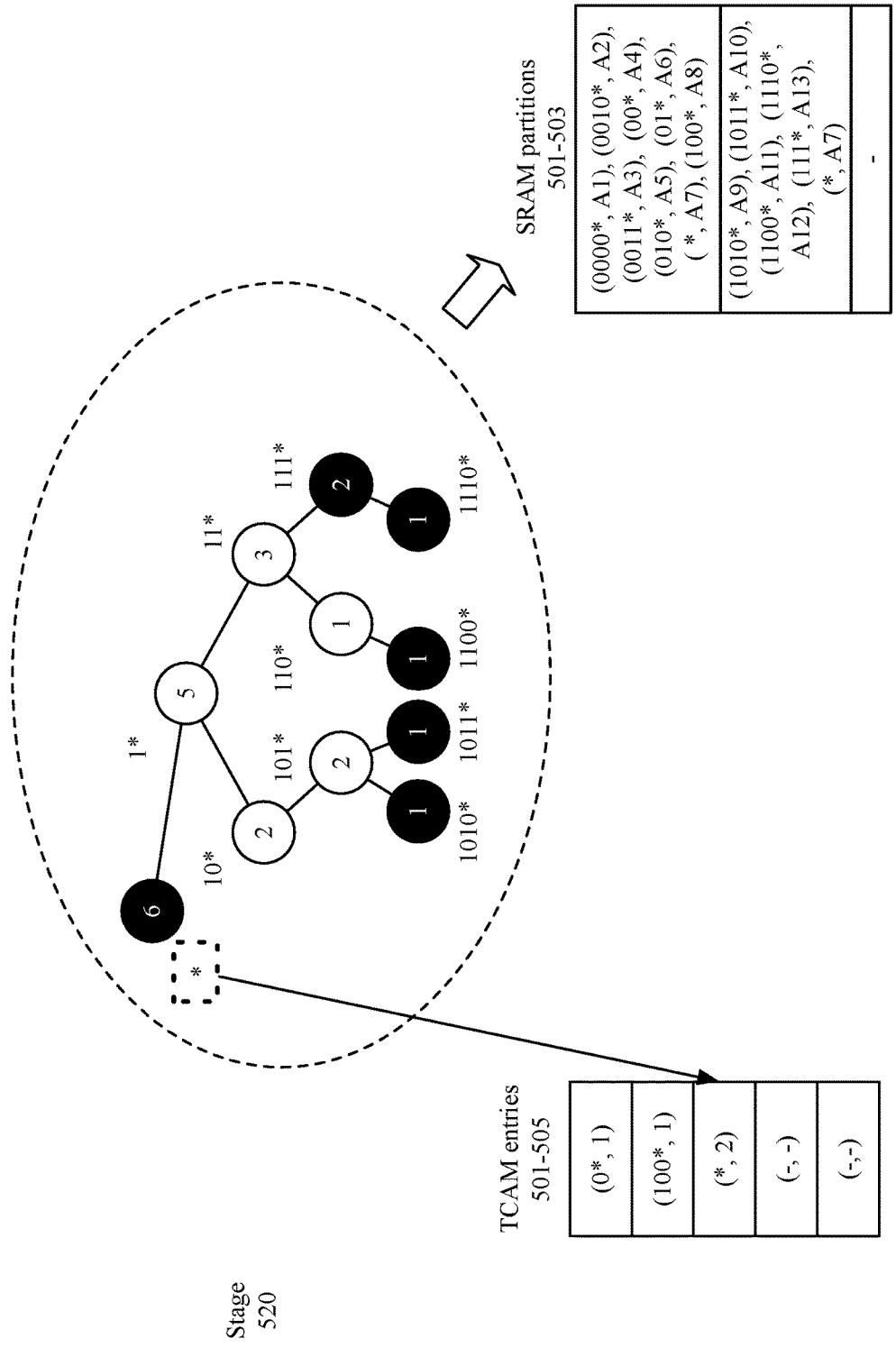

The process then defines (at 415) an initial routing trie division into a set of subtrees. In some embodiments, the initial routing trie is larger than a single partition and must be divided into a number of subtrees. FIGS. 5A-B illustrate an exemplary routing trie division using a routing trie structure with 13 routing entries and a partition size of 8 and will be referred to in the discussion below. FIGS. 5A-B depict a routing trie as having nodes that are either valid (identified as black nodes) or invalid but having valid sub-nodes (identified as white nodes). Both valid and invalid nodes are labeled with the count for the node. The count for each node is updated as subtrees are identified for storage in different partitions. The division, in some embodiments, is performed in a post-order looking for a subtree whose root node has a count that is greater than one half of the partition size (e.g., greater than 4) and whose immediate ancestor has a count that is greater than the partition size (i.e., greater than 8). In stage 500 of FIG. 5A, the node representing the prefix address 0* (hereinafter referred to as node "0*") is identified as having a count greater than 4 (i.e., 6) and having an immediate ancestor (i.e., node "*") having a count greater than 8 (i.e., 13). As shown in stage 510 of FIG. 5A, once the subtree is found (1) the subtree is removed from the routing trie, (2) the counts of the remaining nodes in the routing trie are updated, and (3) the count, "c," of the root node of the subtree is subtracted from the partition size (as measured in entries it can contain) and the process looks for a subtree whose root node has a count greater than one half of the remaining partition size (i.e., greater than ½) and whose immediate ancestor has a count that is greater than the remaining partition size (i.e., greater than 1). FIG. 5A depicts the identification of node "100*" as having a count greater than ½ (i.e., 1) with its immediate ancestor having a count greater than the remaining size of the partition (i.e., a count 3 that is greater than the remaining partition size of 1). As a first approximation, this algorithm can use at least $B-B/2^x$ entries of the partition where x is the maximum number of partitions allowed.

After a given root node for a subtree has been identified as described above, if that root node, for example, node "0*" of FIG. 5A, is not a valid prefix (i.e., does not appear in the routing table) a covering node, i.e., a most-recent ancestor of the subtree root with a valid prefix, for example, node "*" of FIG. 5A, is added, decreasing the remaining partition size by one entry. This process continues until the partition is full or the maximum number of subtrees specified (at 410) is reached. For example, FIG. 5A depicts SRAM partition 501 becoming full (i.e., having 8 entries) after the addition of the second subtree rooted at node "100*". In some embodiments, a partition is full when there is not enough room for another subtree and its covering node. The process is then performed until the remaining, pruned, routing trie fits in a partition as shown in stage 520 of FIG. 5B. In some embodiments, the routing trie is initially empty or sparse and the defined set of subtrees is the entire routing trie which can be stored entirely in one partition.

The process then stores (at 420) the subtrees of the routing trie defined (at 415) in the partitions of a first type of memory (e.g., SRAM partitions 501-503 of FIGS. 5A-B). In some embodiments, the partitions are formed in random access memory (RAM) such as static RAM. In some embodiments, SRAM partitions are used to replace a power-intensive ternary content addressable memory (TCAM) that allows for wildcards to be specified in entries in the TCAM. As opposed to TCAM, the SRAM does not allow for parallel search of the SRAM using wildcard values, but instead performs an exact match search through the entries of the SRAM. In some embodiments, a mask is associated with prefix addresses stored in the SRAM partition to allow for prefix matching. The partitions store data related to the valid nodes of the subtrees stored in the partition as well as the data related to the covering nodes of the subtrees stored in the partition. The data stored in conjunction with the valid nodes, in some embodiments, is an action (i.e., A1-A13 of FIGS. 5A-B) that is to be taken for a data message matching the prefix. In some embodiments, other forms of data such as pointers to other memory locations may be stored in the partitions). One of ordinary skill in the art will appreciate that the storing may be performed in conjunction with the defining of the subtrees such that the subtrees are stored as they are defined as depicted in FIG. 5B.

The process then stores (at 425) each address prefix of a subtree root node in a second memory type along with a pointer to a partition that stores the subtree (e.g., TCAM entries of FIGS. 5A-B). In some embodiments, the second memory type is a TCAM. By defining the number of partitions and limiting the number of subtrees that can be stored in a single partition, the maximum number of entries in the second type of memory can be established. In embodiments using a TCAM, limiting the maximum number of possible entries allows for a smaller amount of the TCAM memory type (e.g., fewer TCAMs or fewer partitions of a larger TCAM) to be searched for each longest prefix matching (LPM) operation. For example, the thirteen entries of the routing trie are now using only three entries of the TCAM to point to two different SRAM partitions instead of using 13 TCAM entries. Since the power necessary for searching a TCAM increases with the size of the TCAM searched, limiting the number of possible TCAM entries allows a smaller TCAM (or smaller partition of a larger TCAM) to be used to perform the search which reduces the power consumption compared to searching a larger TCAM. In some embodiments, a single stage comprises both the first and second memory types participating in the LPM operation, while in other embodiments the second memory type is included in a stage prior to the stage that includes the first type of memory.

Figure 6:
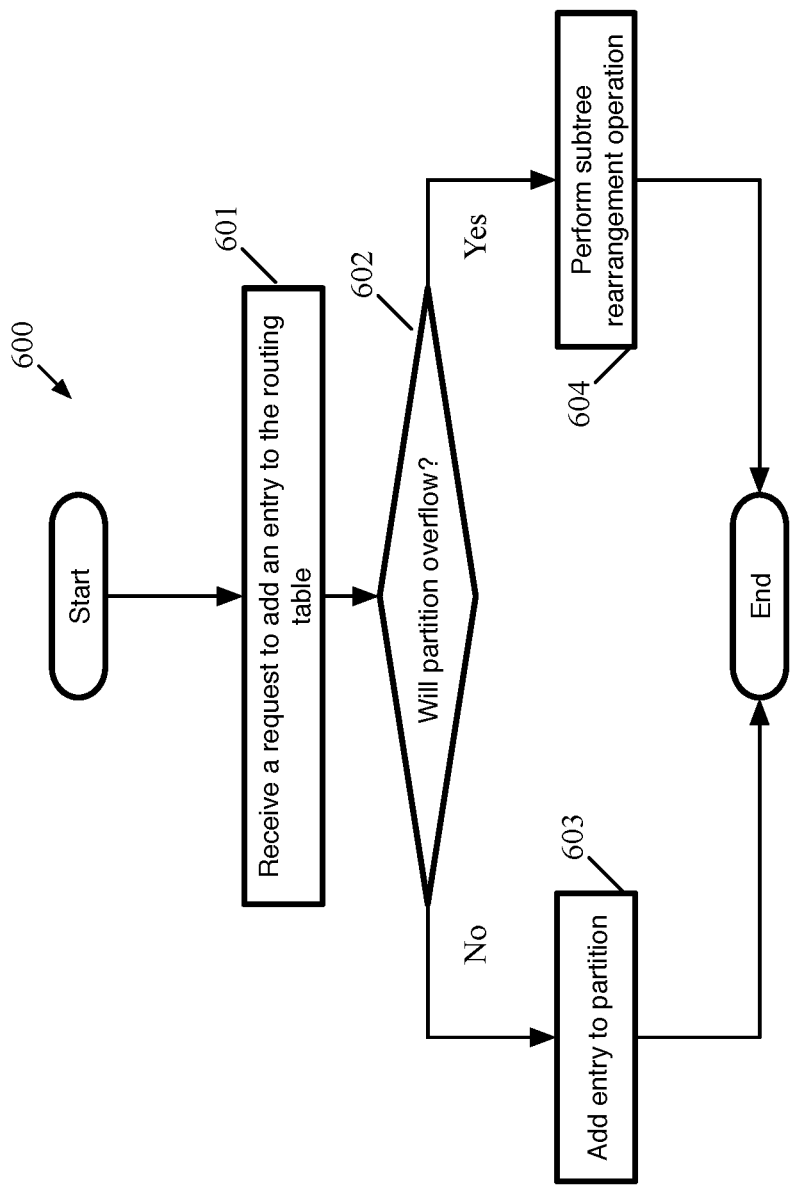
FIG. 6 conceptually illustrates a process 600 for adding entries to the routing table.
Figure 7:
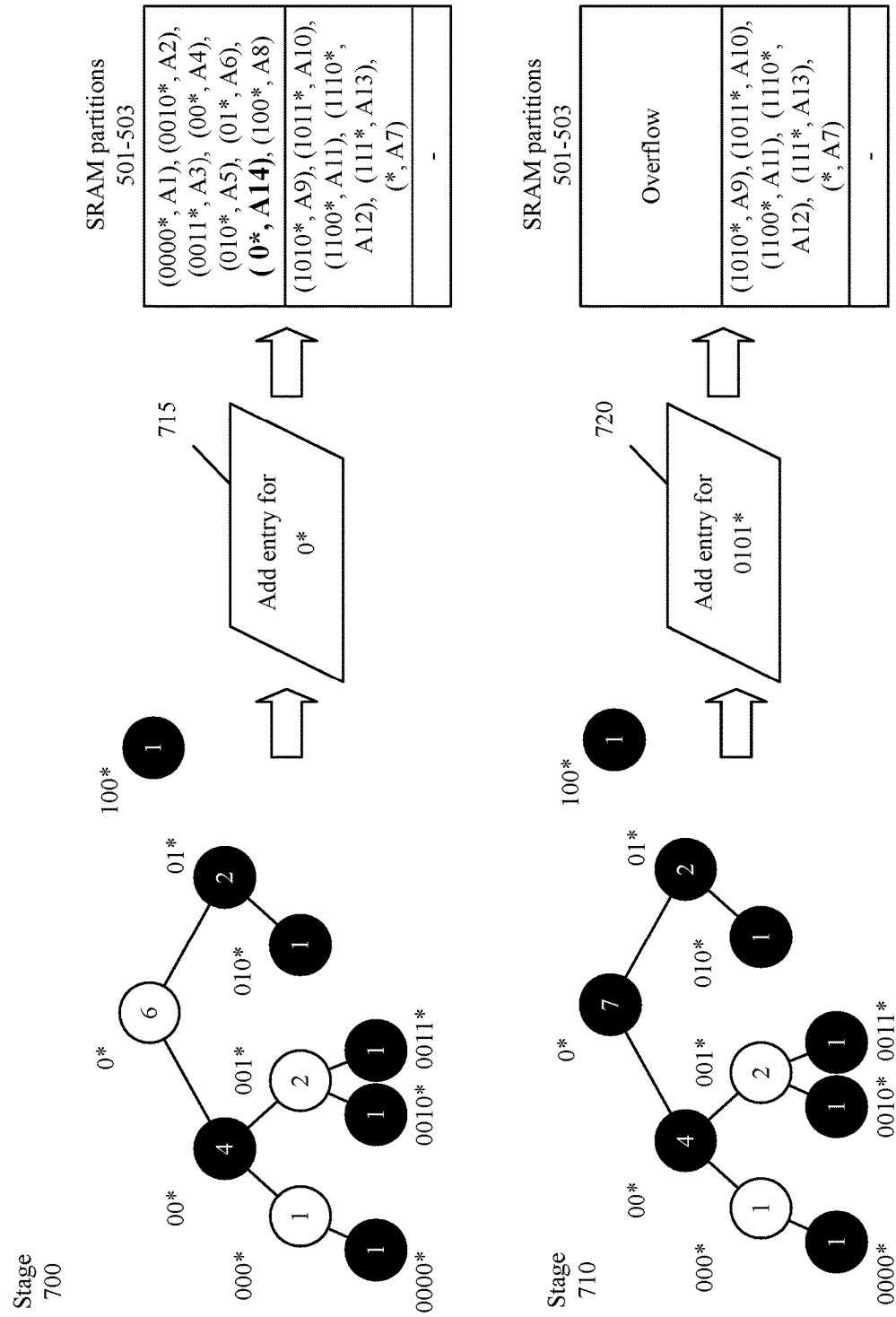
FIG. 7 illustrates two exemplary route entry addition requests.

During runtime, additional entries may be added to the routing table. FIG. 6 conceptually illustrates a process 600 for adding entries to the routing table (and the routing trie). Operations of process 600 will be described in relation to elements of FIG. 7 which assumes the routing trie, partitions and TCAM entries of FIG. 5. FIG. 7 illustrates two exemplary route entry addition requests. Process 600 begins by receiving (at 601) a request (e.g., 715) to add an entry to a routing table. In some embodiments, the request is received from a user to add a rule for a specific address prefix. In some embodiments, the request comes from a controller or some other component of the switch or network that adds rules for specific addresses as the need arises. For example, a data message associated with an address that is not yet included in the routing table may have its next hop address identified by a response to an address resolution protocol request and the address and the associated next hop would be added to the routing table. Additionally, a switch may receive an advertisement of an available address from another network element e.g., as part of a border gateway protocol advertisement).)

The process then determines (at 602) if adding the routing entry to the subtree to which the address belongs would cause the partition to overflow. A partition will overflow if, before adding the requested routing entry, it has reached the maximum number of routing entries (e.g., SRAM partition 501 of FIG. 7 after the addition of a route entry for node "0*"). The size of the partition (along with the number of partitions and maximum number of subtrees per partition), in some embodiments, is defined by a user in a program. The program, in some embodiments, is written in a high-level programming language (e.g., P4) that is compiled to be executed by the switch hardware. The partition size may be based on an expected size of the routing table.

If process 600 determines (at 602) that adding the routing table entry to the partition would not cause the partition to overflow, the process adds (at 603) the routing entry to the partition. As part of adding the entry to the partition, process 600 updates the count of the nodes (how many valid nodes exist in the subtree rooted at the node) in the subtree (as done in stage 710 for the subtree rooted at node "0*"). The updated counts are then usable for any subsequent additions that require subtree splitting. Process 600 also determines, as part of adding the routing entry, if any covering prefixes for other subtrees should be replaced by the newly-added node's prefix (as for the subtree rooted at "0*" which previously required an entry for covering node "*"). In the example of request 715, the added node replaced the covering node in a full partition, allowing the requested node to be added without overflowing a full partition. Updating the count and the covering prefixes of other nodes are independent of each other and may be performed in any order. The process then ends.

If process 600 determines (at 602) that adding the routing table entry to the partition would cause the partition to overflow (as in stage 710 of FIG. 7), the process performs (at 604) a subtree rearrangement operation. The subtree rearrangement operation, in some embodiments, is a moving or swapping process as will be described in relation to FIGS. 8, 9A-G, 10 and 11A-D. In some embodiments, there is a preference for the swapping process described in relation to FIG. 8 over the moving process described in relation to FIG. 10. In other embodiments, a moving process is preferred until all partitions but one store subtrees at which point a swapping operation is preferred.

Figure 8:
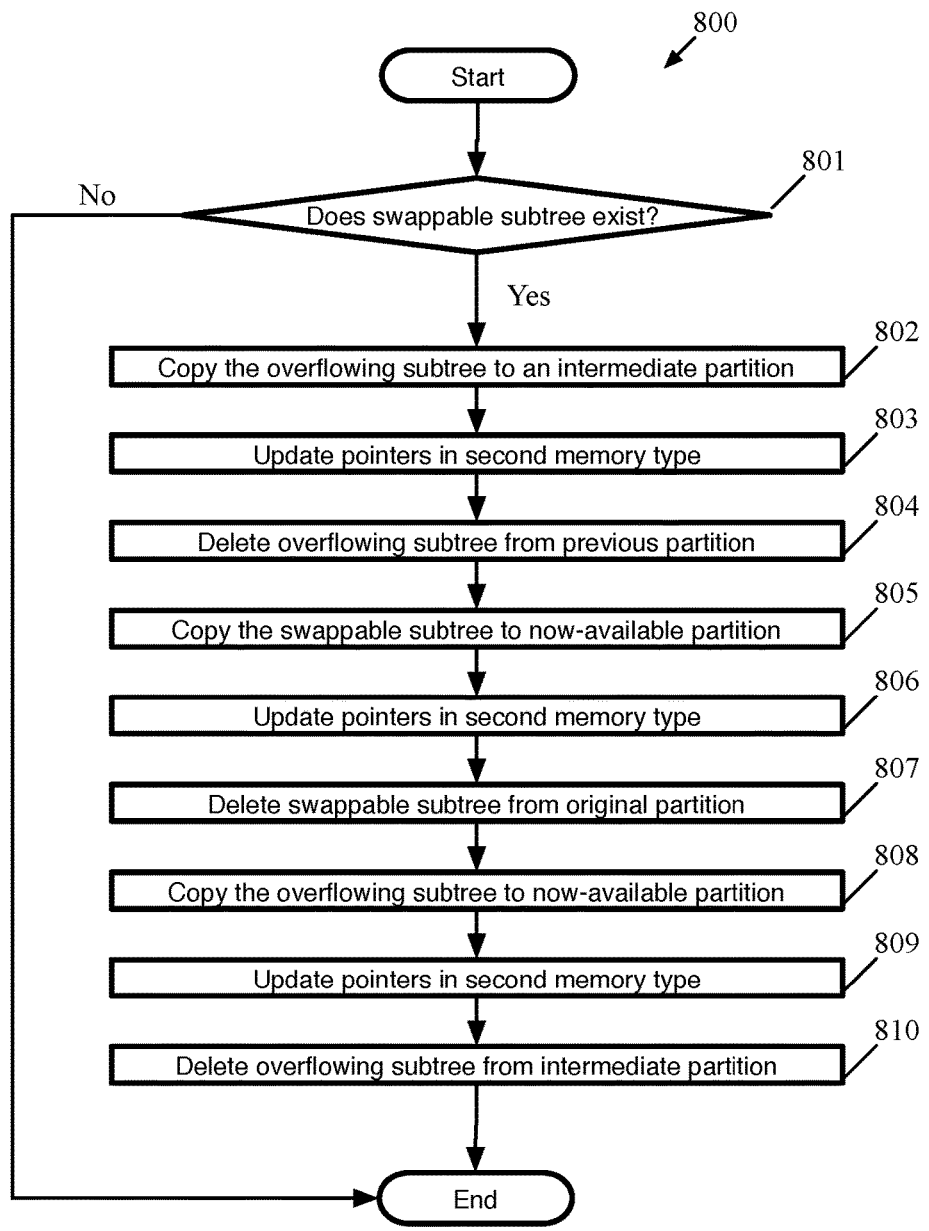
FIG. 8 conceptually illustrates swapping process that, in some embodiments, is performed when adding a routing entry to a subtree would cause the partition storing the subtree to overflow.
Figure 9A:
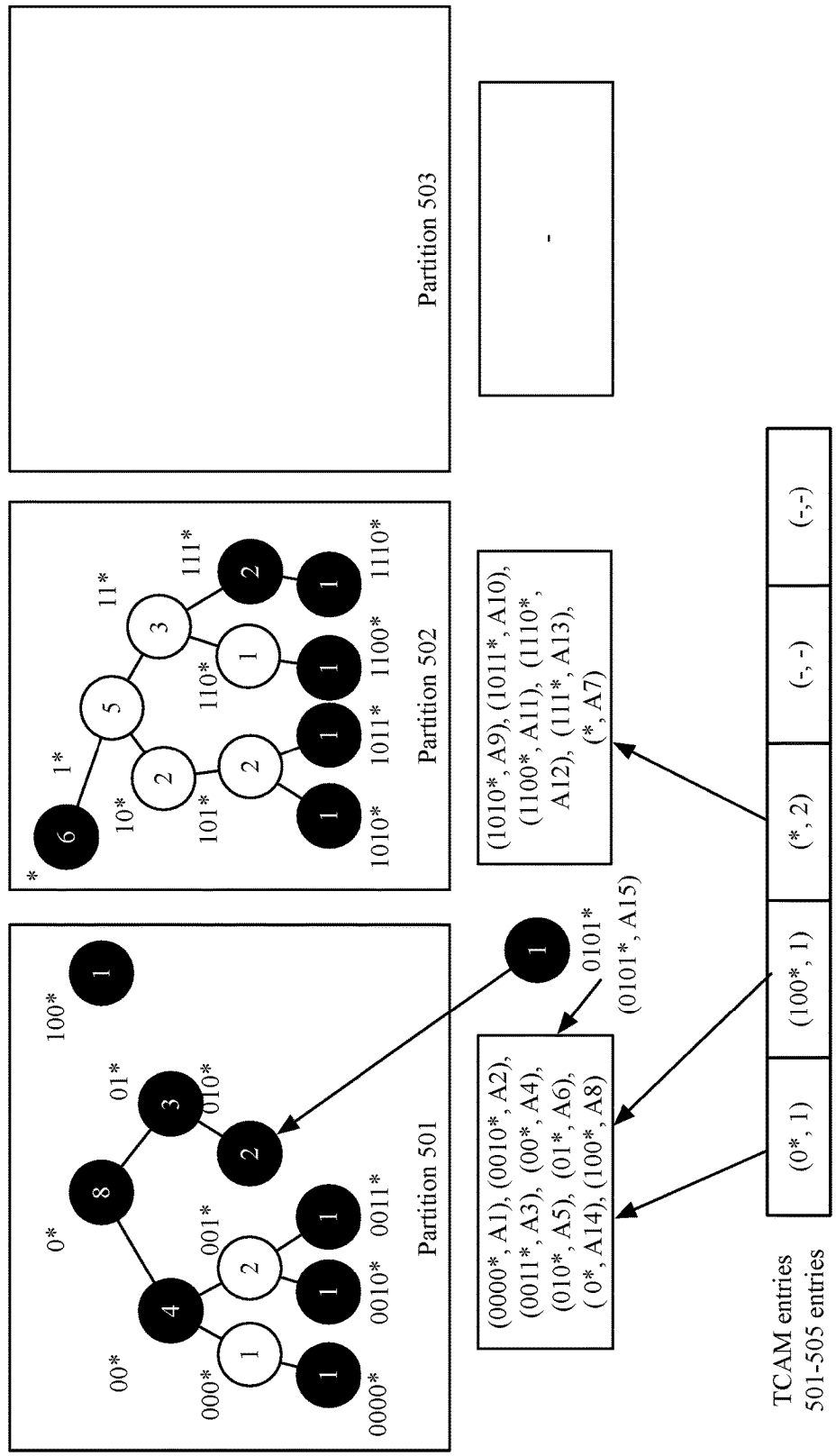
FIG. 9A-G illustrates an exemplary swapping operation of some embodiments for a subtree that causes its partition to overflow.

FIG. 8 conceptually illustrates swapping process 800 that, in some embodiments, is performed when adding a routing entry to a subtree would cause the partition storing the subtree to overflow. FIGS. 9A-G illustrates an exemplary swapping operation of some embodiments for a subtree rooted at node "0*" that causes its partition to overflow. Process 800 begins by determining (at 801) if a swappable subtree exists. In some embodiments a swappable subtree must be smaller than the overflowing subtree to which the switch is attempting to add the new node/entry (including the added entry) and the partition in which the swappable subtree is stored must not overflow if the swappable subtree is replaced by the overflowing subtree. In FIG. 9A, the subtree rooted at a node "*" would be swappable with the overflowing subtree rooted at "0*" because it is smaller than the overflowing subtree and partition 502 can fit the entire overflowing subtree. In some embodiments, determining if there is a swappable partition includes determining whether an empty partition (or a partition with enough space to fit the overflowing (or swappable) subtree) exists to temporarily store the overflowing (or swappable) subtree during the swapping process.

In some embodiments, if the overflowing partition does not store the maximum number of subtrees, determining if a swappable subtree exists also includes considering if a swappable subtree exists for a sub-subtree of the overflowing subtree. In some embodiments, swappable subtrees are searched for sub-subtrees of the overflowing subtree. The sub-subtrees considered may be considered in a level-order, or in descending count order of the nodes of the subtree (with level-order used to order nodes with equal counts). If the process determines (at 801) that no swappable subtree exists, the swapping process ends. In some embodiments, the ending of a swapping process triggers a move process. The move process will be described in relation to FIG. 10.

Figure 9B:
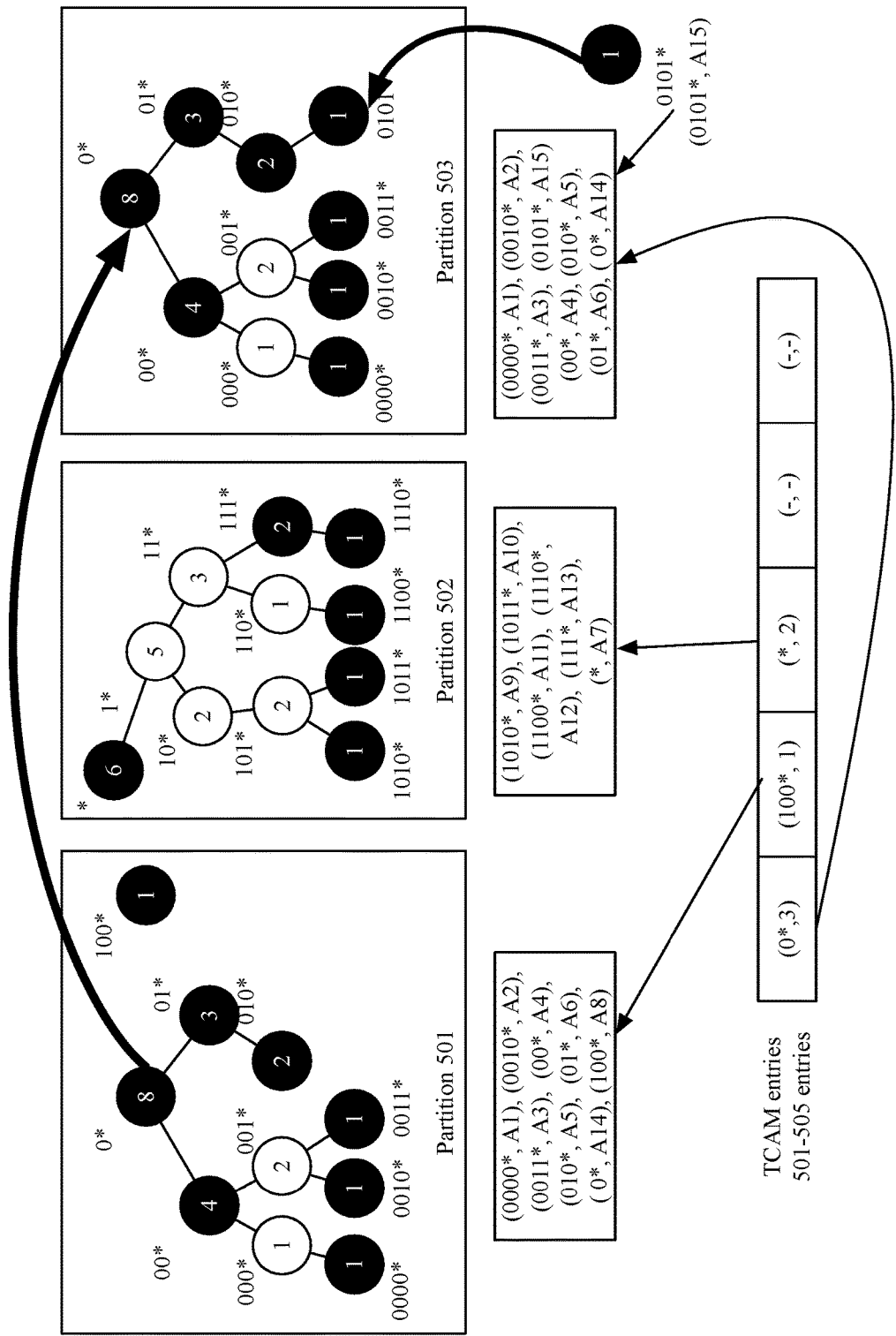
Figure 9C:
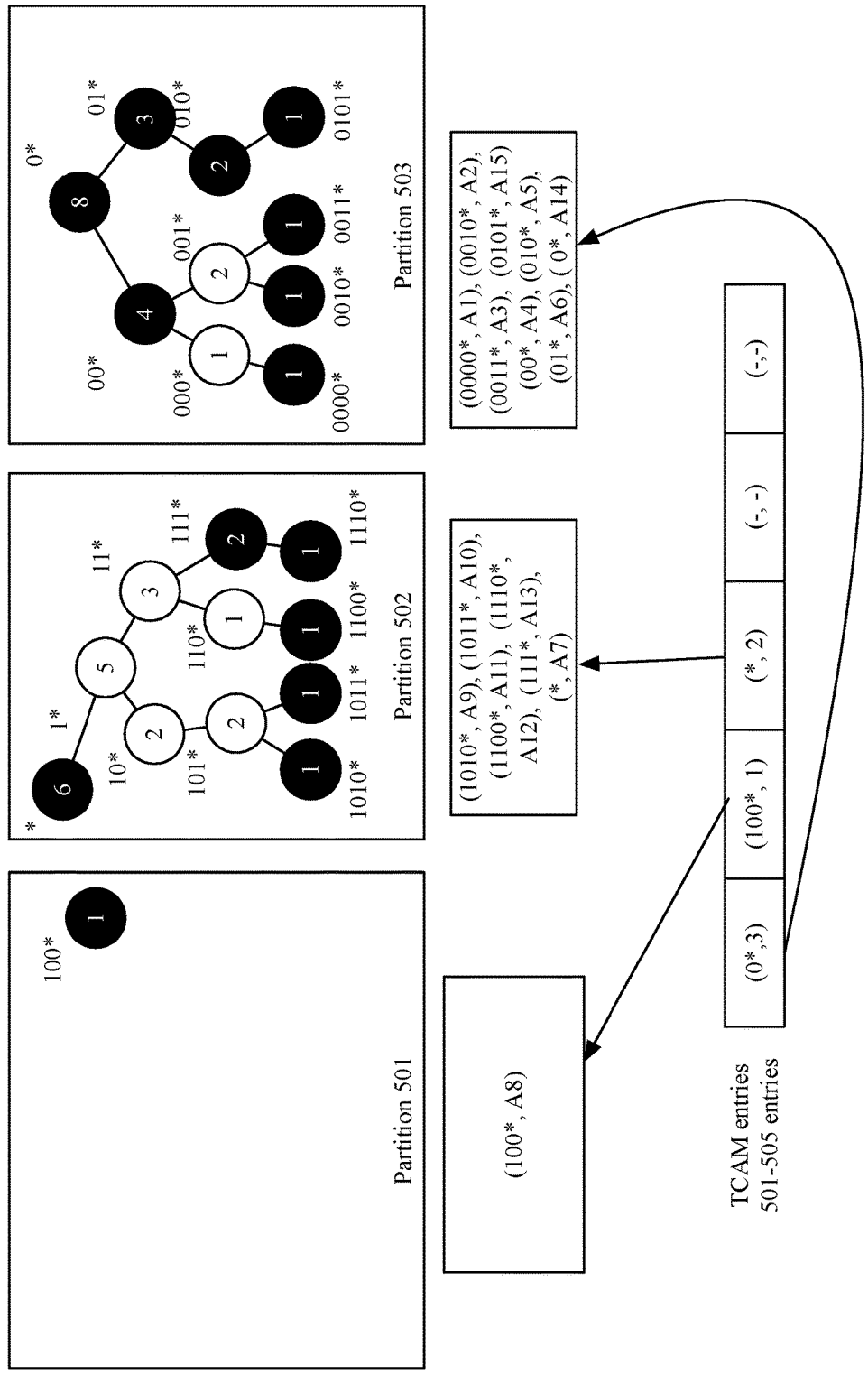

If the process determines (at 801) that a swappable subtree exists, the process copies (at 802) the overflowing subtree (or sub-subtree) to an intermediate partition (e.g., overflowing subtree rooted at "0*" is copied to partition 503 in FIG. 9B) with enough available space to store the overflowing subtree. As depicted in FIG. 9B, the swappable subtree includes the added routing entry. If a swappable sub-subtree is identified, the routing entry may be added to either the remaining subtree or the swappable sub-subtree based on the root node of the sub-subtree and the prefix associated with the added routing entry. Assuming that an empty partition exists to implement process 800, there is no practical difference between moving the overflowing subtree first versus the swappable subtree. However, in situations for which a mostly-empty partition is used to implement process 800, it may be necessary to move the swappable (and by definition smaller) subtree to the mostly-empty partition if, as in FIG. 9A, the overflowing subtree would not fit in a mostly-empty partition. An overflowing subtree may not fit in a mostly-empty partition either because it entirely fills a partition or because it contains more entries than are available in the mostly-empty partition. In order to avoid any disruption of traffic, the process then updates (at 803) the pointer in the second memory type (e.g., TCAM) to the root node of the subtree to point to the partition with the copied version of the overflowing tree including the newly added entry. For example, FIG. 9B illustrates that the pointer in TCAM entry 1 for root node "0*" now points to partition 503 ('3'). Once the overflowing subtree has been copied and the pointer updated, the process (at 804) deletes the overflowing subtree from its previous partition. For example, FIG. 9C illustrates that the subtree rooted at node "0*" has been deleted from partition 501. One of ordinary skill in the art will understand that, in some embodiments, a confirmation that each of these operations has been successfully performed will be provided or received before proceeding to the next operation.

Figure 9D:
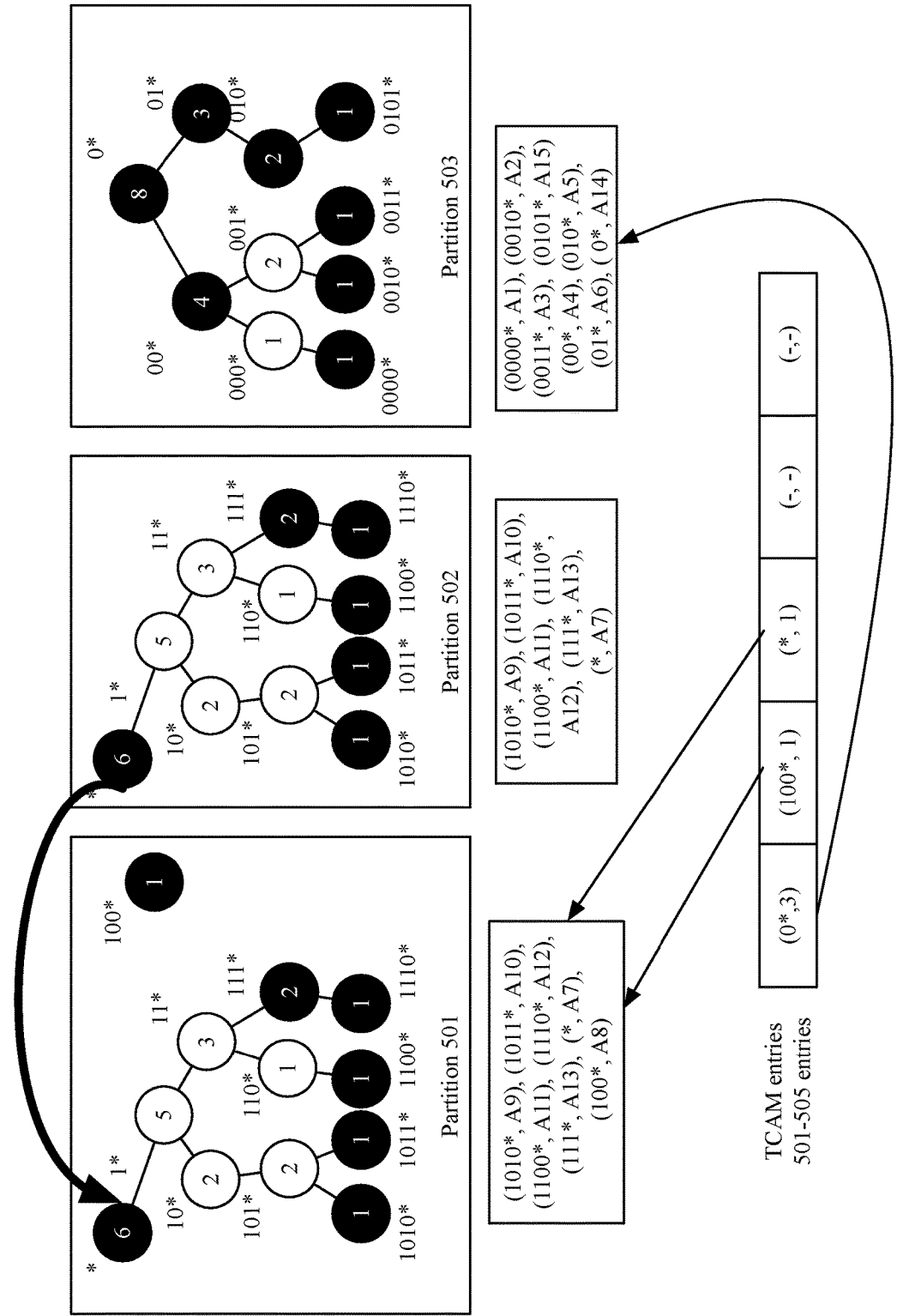
Figure 9E:
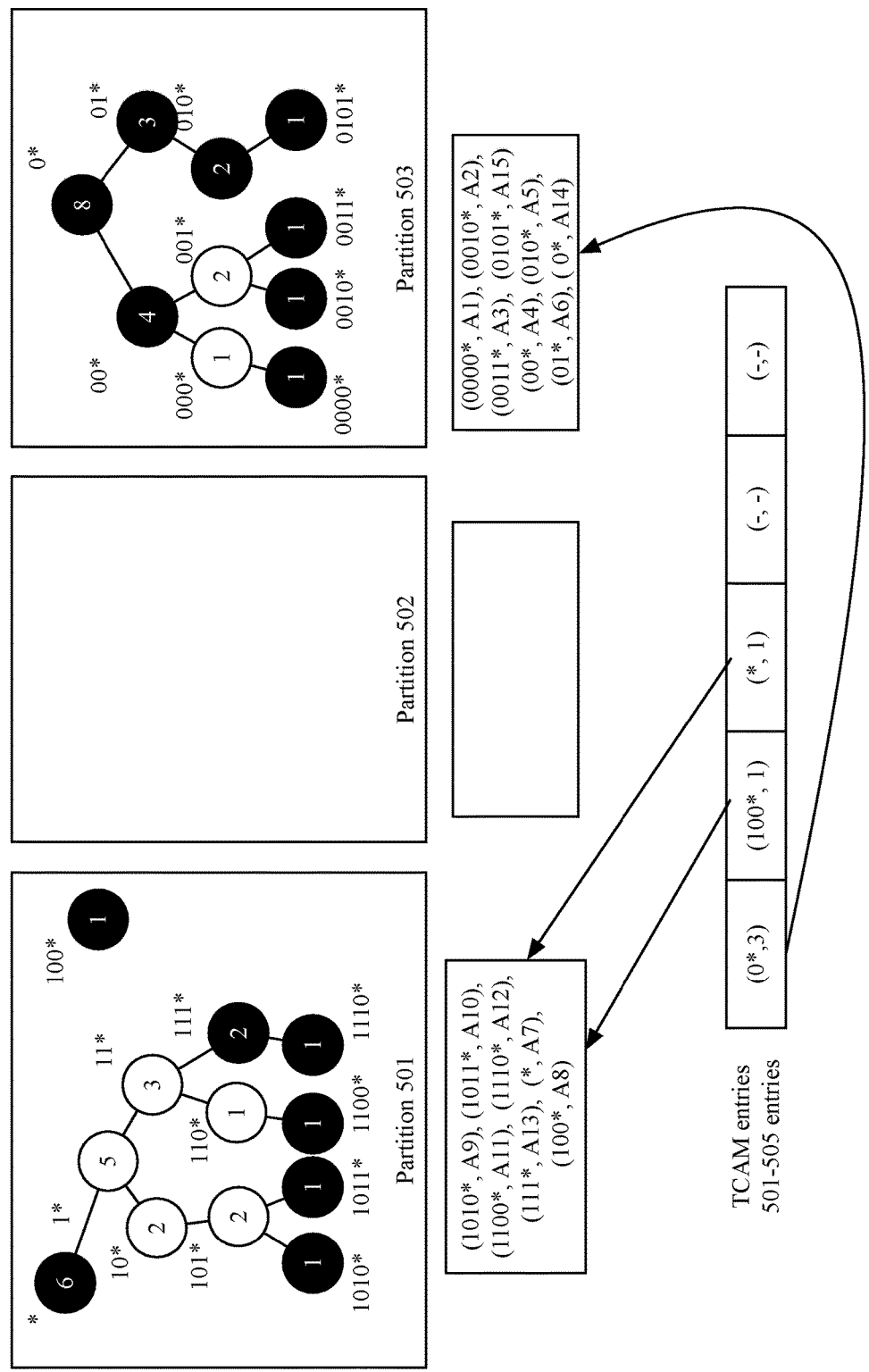

After the overflowing subtree is successfully moved, the process copies (at 805) the swappable subtree to the now-available space in the partition that formerly held the overflowing subtree. To avoid any disruption of traffic, the process updates (at 806) the pointer in the second memory type (e.g., TCAM) to the root node of the swappable subtree to point to the partition with the copied version of the swappable subtree. FIG. 9D illustrates the swappable subtree rooted at node "*" being copied to partition 501 and the pointer associated with prefix address "*" being updated to point to partition 501 ('1'). After updating the pointer, the process deletes (at 807) the swappable subtree from the partition originally storing the swappable subtree. For example, FIG. 9E illustrates that the subtree rooted at node "*" has been deleted from partition 502. One of ordinary skill in the art will understand that, in some embodiments, a confirmation that each of these operations has been successfully performed will be provided or received before proceeding to the next operation.

Figure 9F:
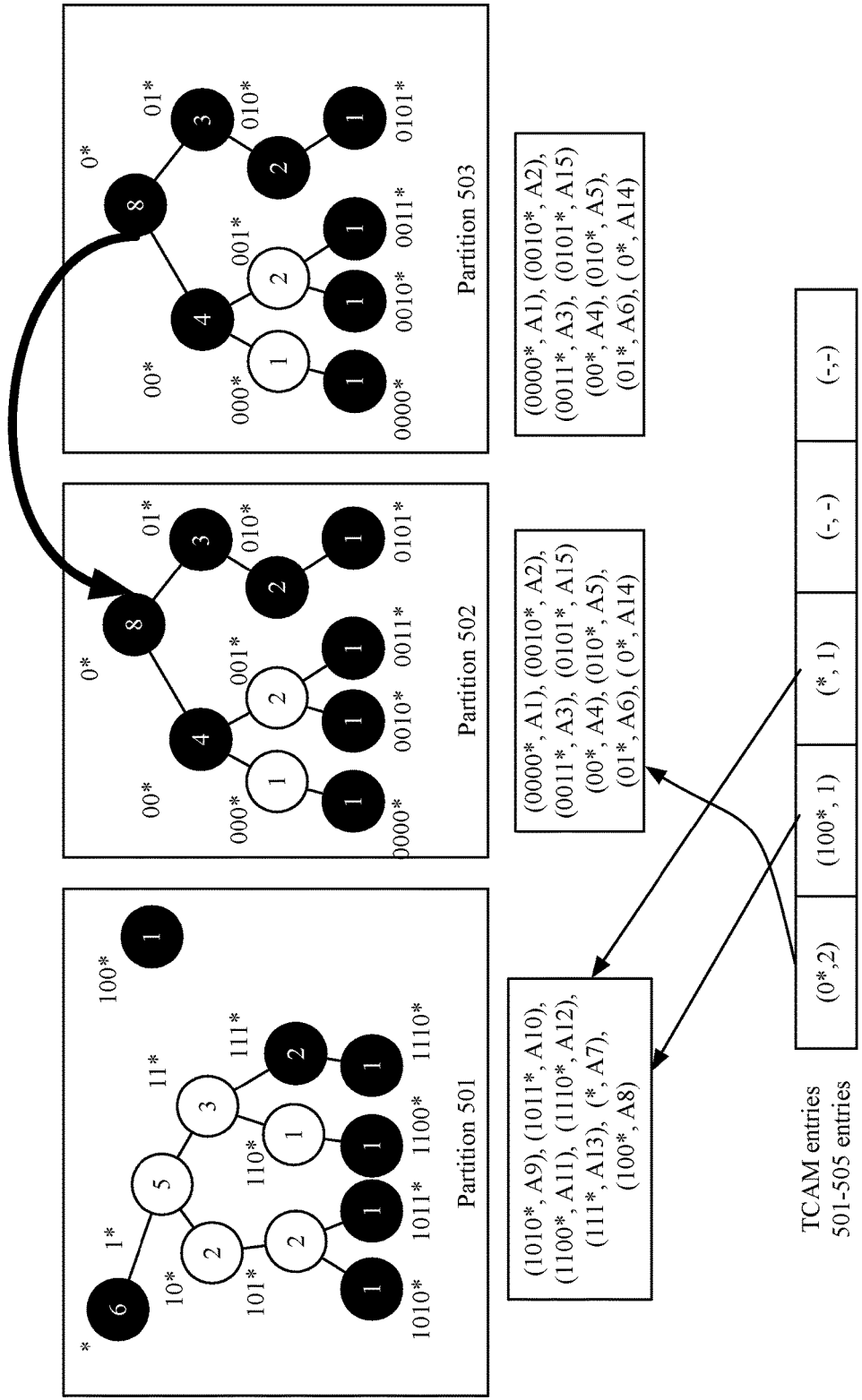
Figure 9G:
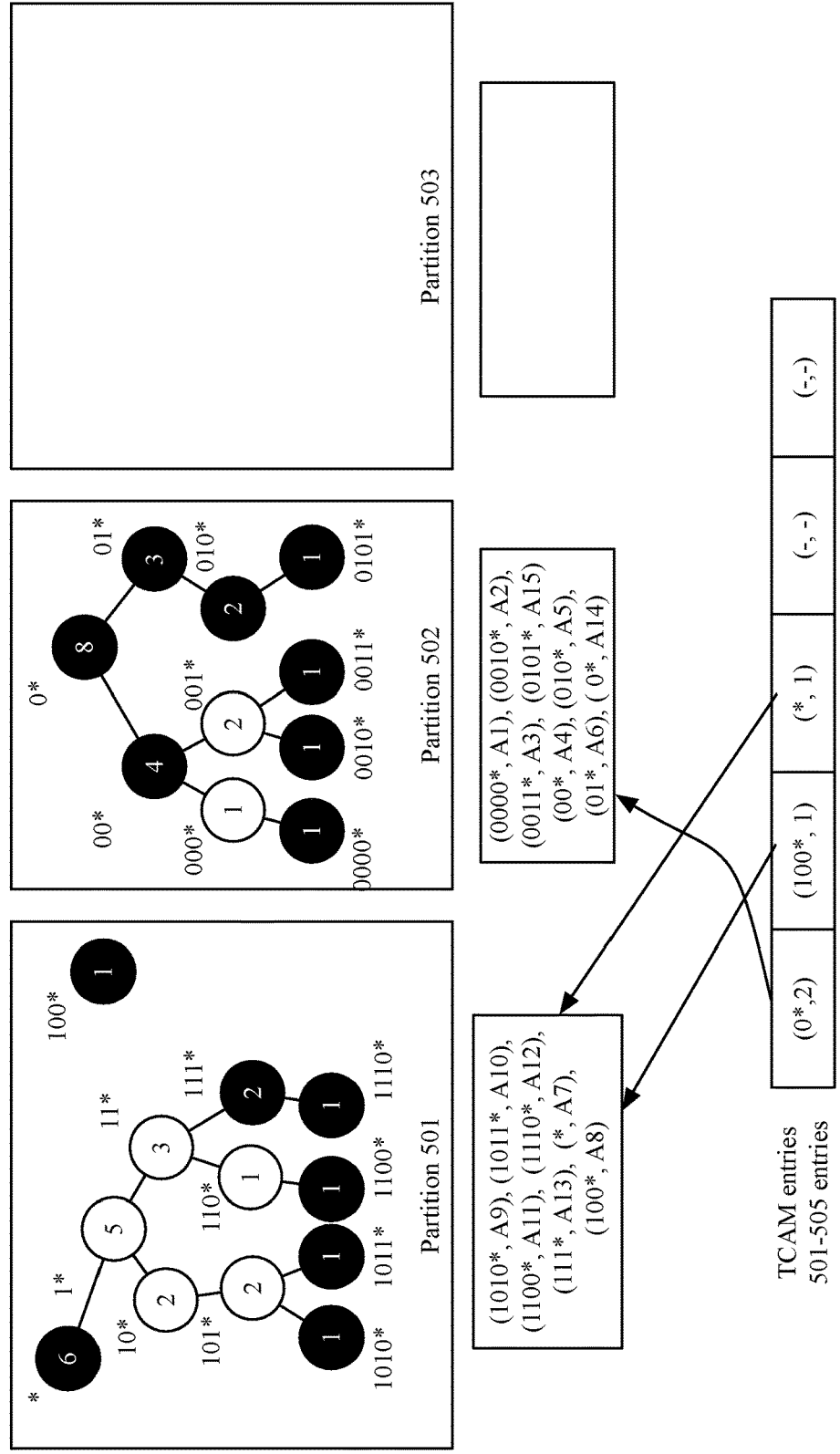

After the swappable subtree has been deleted from its former partition, the process copies (at 808) the overflowing subtree (or sub-subtree) to the partition that used to store the swappable subtree. In order to avoid any disruption of traffic, the process then updates (at 809) the pointer in the second memory type (e.g., TCAM) to the root node of the subtree to point to the partition that used to store the swappable subtree and now stores the overflowing subtree. FIG. 9F illustrates the overflowing subtree rooted at node "0*" being copied to partition 502 and the pointer associated with prefix address "0*" being updated to point to partition 502 ('2'). At this point in the process the term 'overflowing subtree' is merely a convenient label as the overflowing subtree by design does not overflow its new partition. Once the overflowing subtree has been copied and the pointer updated, the process (at 810) deletes the overflowing subtree from the intermediate partition. FIG. 9G illustrates that the subtree rooted at node "0*" has been deleted from partition 503, leaving partition 503 free to be used for more swapping or moving operations. One of ordinary skill in the art will understand that, in some embodiments, a confirmation that each of these operations has been successfully performed will be provided or received before proceeding to the next operation. The process then ends. In reference to FIGS. 9A-G, one of ordinary skill in the art would understand that if partition 502 is left empty after deleting the subtree rooted at node "*", some embodiments would not perform operations 808-810. It is understood that, in some embodiments, the swappable subtree may be the object of operations 802-804 and 808-810 while the overflowing subtree will be the object of operations 805-807, such that the swappable subtree is moved first to the intermediate partition, the overflowing subtree is then moved to the space freed up by the moved swappable subtree and then the swappable subtree is placed in the space freed up by the moved overflowing subtree.

Figure 10:
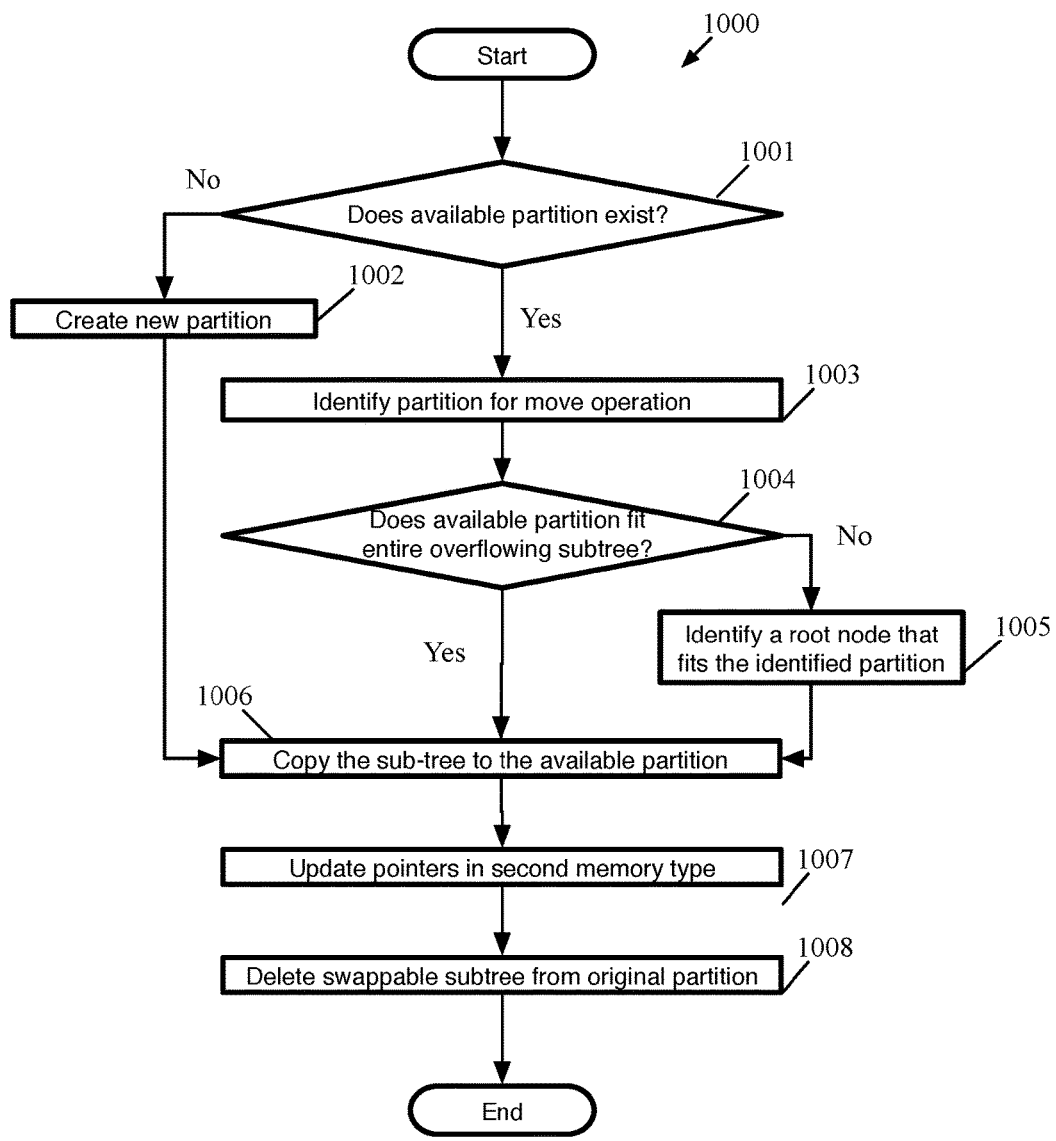
FIG. 10 conceptually illustrates a process for handling an overflowing subtree by moving it to a different partition.
Figure 11A:
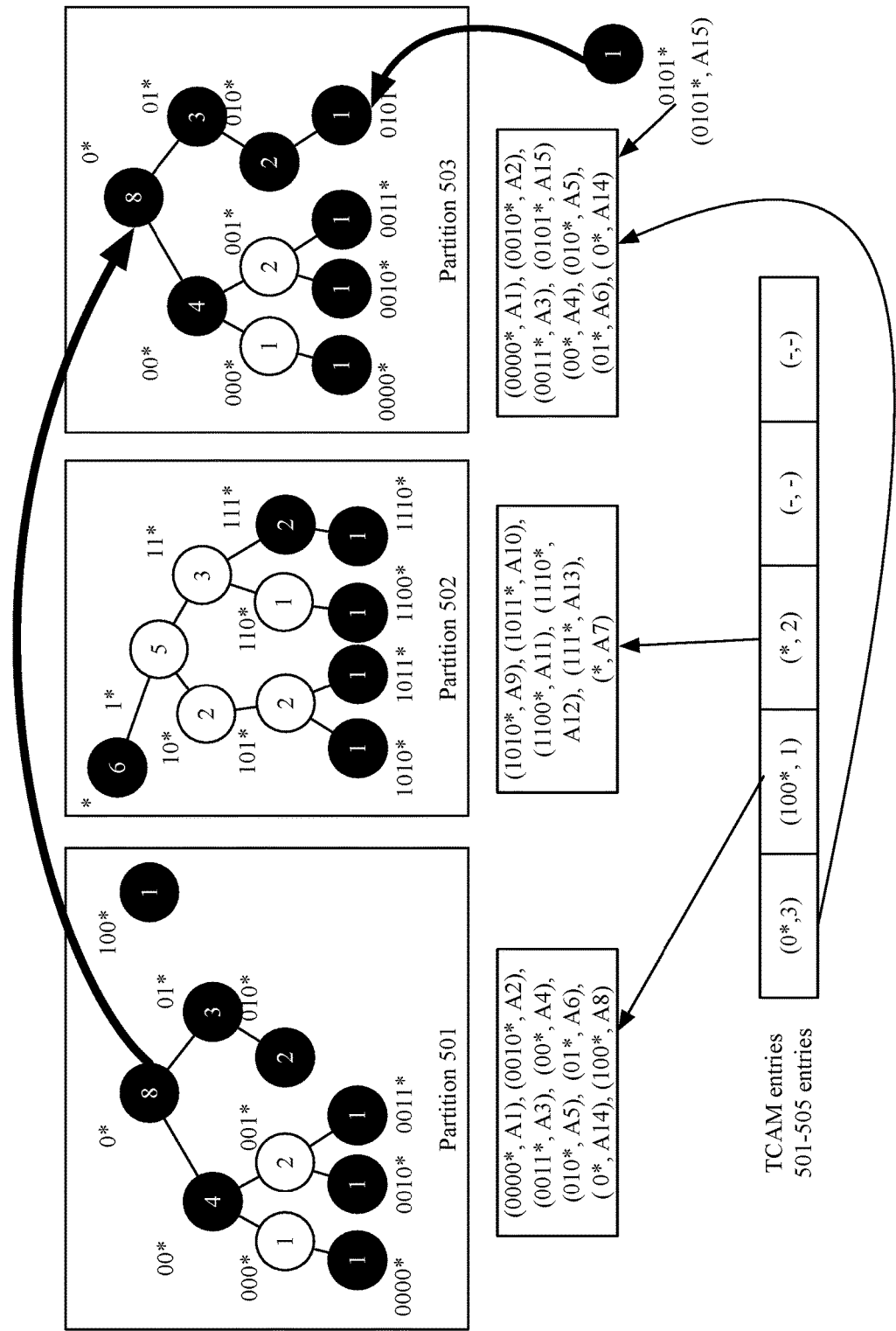
FIGS. 11A-D illustrate an exemplary moving process for an overflowing subtree based on a request to add a routing entry and a deletion process based on a request to delete a routing entry.
Figure 11B:
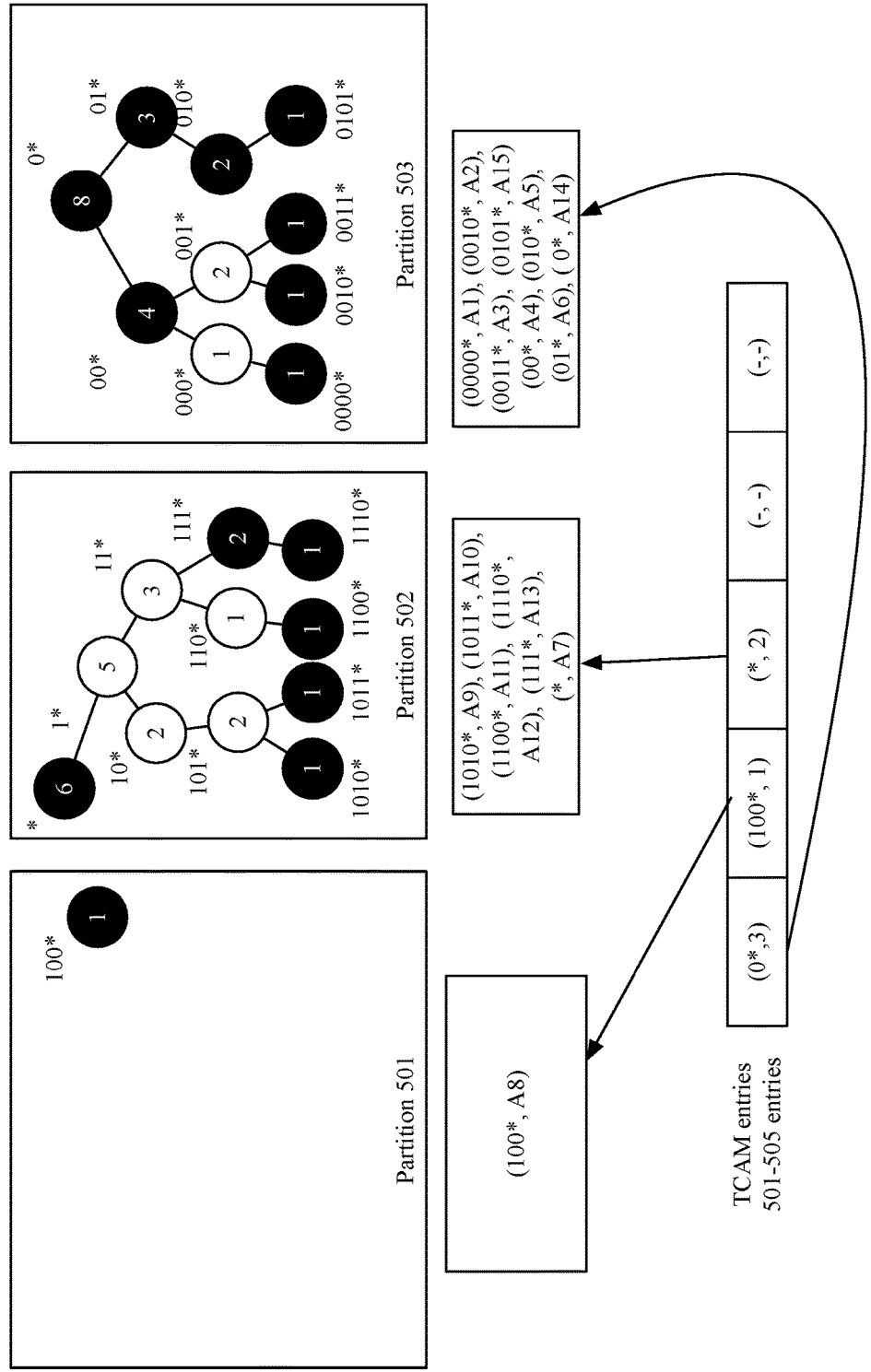

FIG. 10 conceptually illustrates a process 1000 for handling an overflowing subtree by moving it to a different partition. FIGS. 11A-B illustrate a moving process for the overflowing subtree based on request 720 of FIG. 7. In some embodiments, process 1000 is used as an alternative to process 800. In some embodiments, process 1000 is performed by a controller of a switch as described in relation to FIG. 1. Process 1000, in some embodiments, is a preferred process for handling overflowing subtrees until only one empty partition is available, at which point a swapping process as described in relation to FIG. 8 becomes the preferred process. Process 1000 is performed, in some embodiments, when a request to add an entry to a routing table (and a subtree of the routing trie) causes a subtree in a particular partition to overflow the partition.

Process 1000 begins by determining (at 1001) whether an existing partition exists that satisfies a set of availability conditions. In some embodiments, the availability conditions are a threshold amount of space available in the partition (e.g., 10%, 30%, space for a particular number of entries, etc.) and that the partition does not store the maximum number of partitions allowed. The threshold requirement, in some embodiments, are designed to avoid creating too many smaller subtrees and exhausting the allowed number of subtrees per partition without being able to store a large number of routing entries. If the process determines (at 1001) that no partition exists that satisfies the availability conditions, a new partition is created (at 1002) and the process continues to operation 1006 described below.

If the process determines (at 1001) that a partition exists that satisfies the availability conditions, the process identifies (at 1003) a particular partition to use for the subsequent operations. For example, partition 503 of FIG. 11A is identified as an available partition for moving the subtree rooted at node "0*". In some embodiments, the identification involves selecting a particular partition from a plurality of partitions that meet the availability criteria. The identification, in some embodiments, takes into account one or more of the available space in the partition, the number of subtrees in the partition, and the size of the overflowing subtree. The identified partition, in some embodiments, may be the partition that has the most available space, the partition that has the smallest amount of available space that is larger than the overflowing subtree by some margin (so as to avoid wasting space while at the same time leaving room for additional entries without triggering another set of overflow handling operations), the partition that has the least number of subtrees and has at least enough available space to fit the overflowing subtree, etc.

After the partition to use for the subsequent operations is identified, the process determines (at 1004) whether the overflowing subtree fits in the identified partition in its entirety. If the process determines (at 1004) that the overflowing subtree fits in the identified partition in its entirety, the process continues to operation 1006 described below. But, if the process determines (at 1004) that the overflowing subtree does not fit in the identified partition in its entirety, the process identifies (at 1005) a root node for a sub-subtree such that the sub-subtree fits into the identified partition. In some embodiments, the root node for the sub-subtree is the first node that has a count that is at least one half of the available space in the identified partition and whose immediate ancestor's count is greater than the available space in the partition. In some embodiments, the "first" node to satisfy the conditions is first in a post-order search. In other embodiments, the root node for the sub-subtree is the first node that has a count that is less than the available space in the identified partition and whose immediate ancestor's count is greater than the available space in the partition.

Once either a new partition is created (at 1002), the availability of a partition that fits the subtree is determined (at 1004), or a sub-subtree that fits an available partition is identified (at 1005), the process copies (at 1006) the subtree or sub-subtree to the available partition. For example, FIG. 11A depicts the subtree rooted at "0*" being copied to partition 503. As shown in FIG. 11B, the additional routing entry is added to the subtree (or sub-subtree) as part of the moving process. However, if process 1000 splits the overflowing subtree, the routing entry that is the subject of the request to add a routing entry may end up in either the subtree that remains in the original overflowing partition or in the available partition to which the sub-subtree has been moved (copied). If the root node is not a valid prefix, a covering node for the subtree (or sub-subtree) is also added to the available partition. Once the subtree has been copied and the additional routing entry added, the process updates (at 1007) the pointer in the second memory type (e.g., a TCAM) to point to the new partition location, or, if a sub-subtree was identified, the second memory type is updated (at 1007) to include the root node as an indexed value associated with a pointer to the available partition. For example, FIG. 11A depicts the subtree rooted at "0*" being copied to partition 503 and the pointer associated with prefix address "0*" being updated to point to partition 503('3').

After updating (at 1007) the second memory type to reflect the movement of the subtree (or sub-subtree), the process deletes (at 1008) the copied subtree from the original overflowing partition. FIG. 11B illustrates that the subtree rooted at node "0*" has been deleted from partition 501, leaving partition 501 with a single entry pointed to by the TCAM entry. In some embodiments, a cleanup operation is performed periodically that recognizes that the subtree rooted at node "100*" can be incorporated into the subtree rooted at "*" without overflowing partition 502, thus reducing the number of TCAM entries and rendering partition 501 empty and available for future moving and swapping operations. One of ordinary skill in the art will appreciate that the additional entry in the routing table as well as the splitting and moving of subtrees requires counts associated with nodes of the routing trie to be updated and, in some embodiments, new covering nodes to be identified for new and existing root nodes. The process then ends.

Figure 11C:
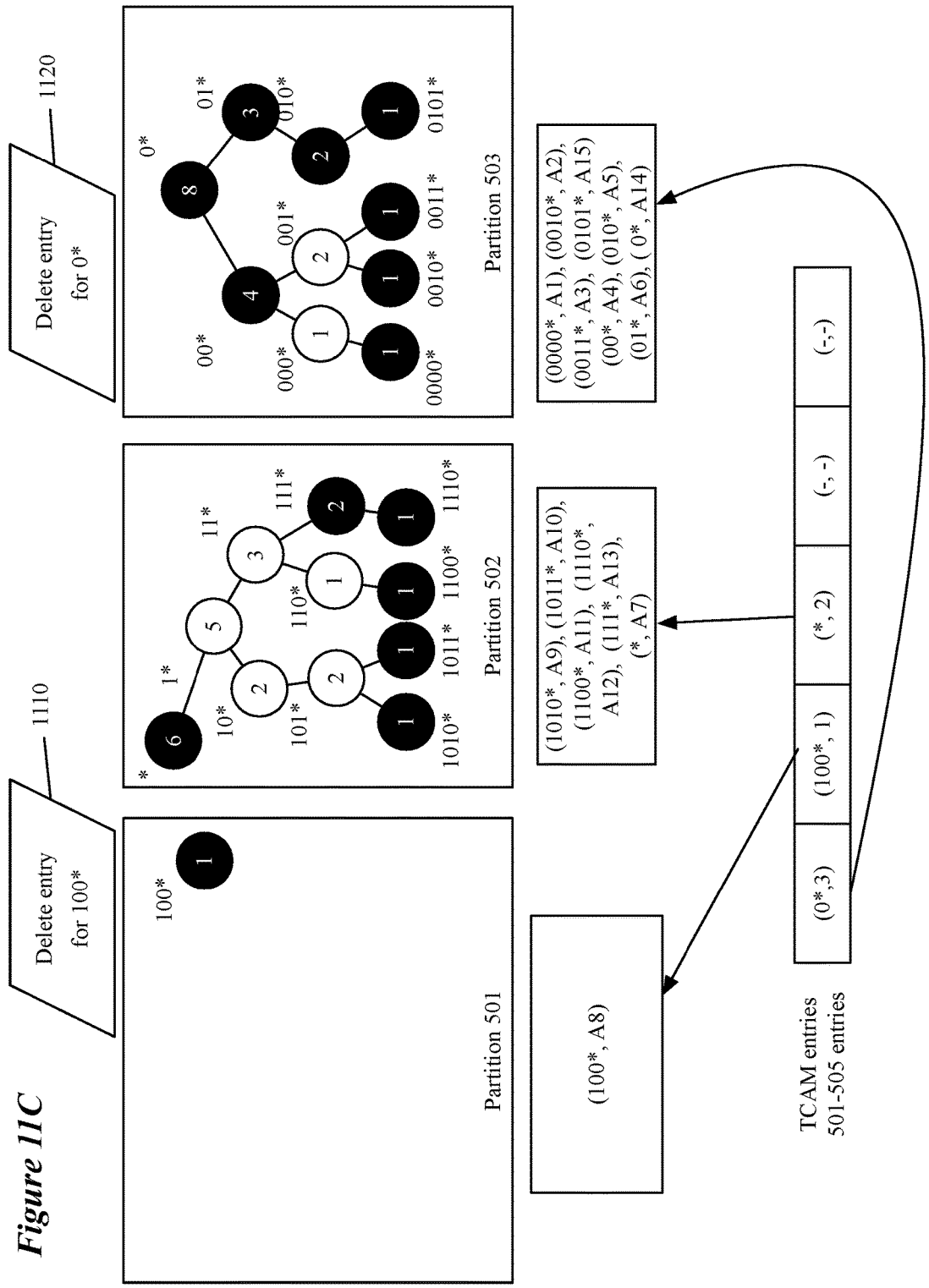
Figure 11D:
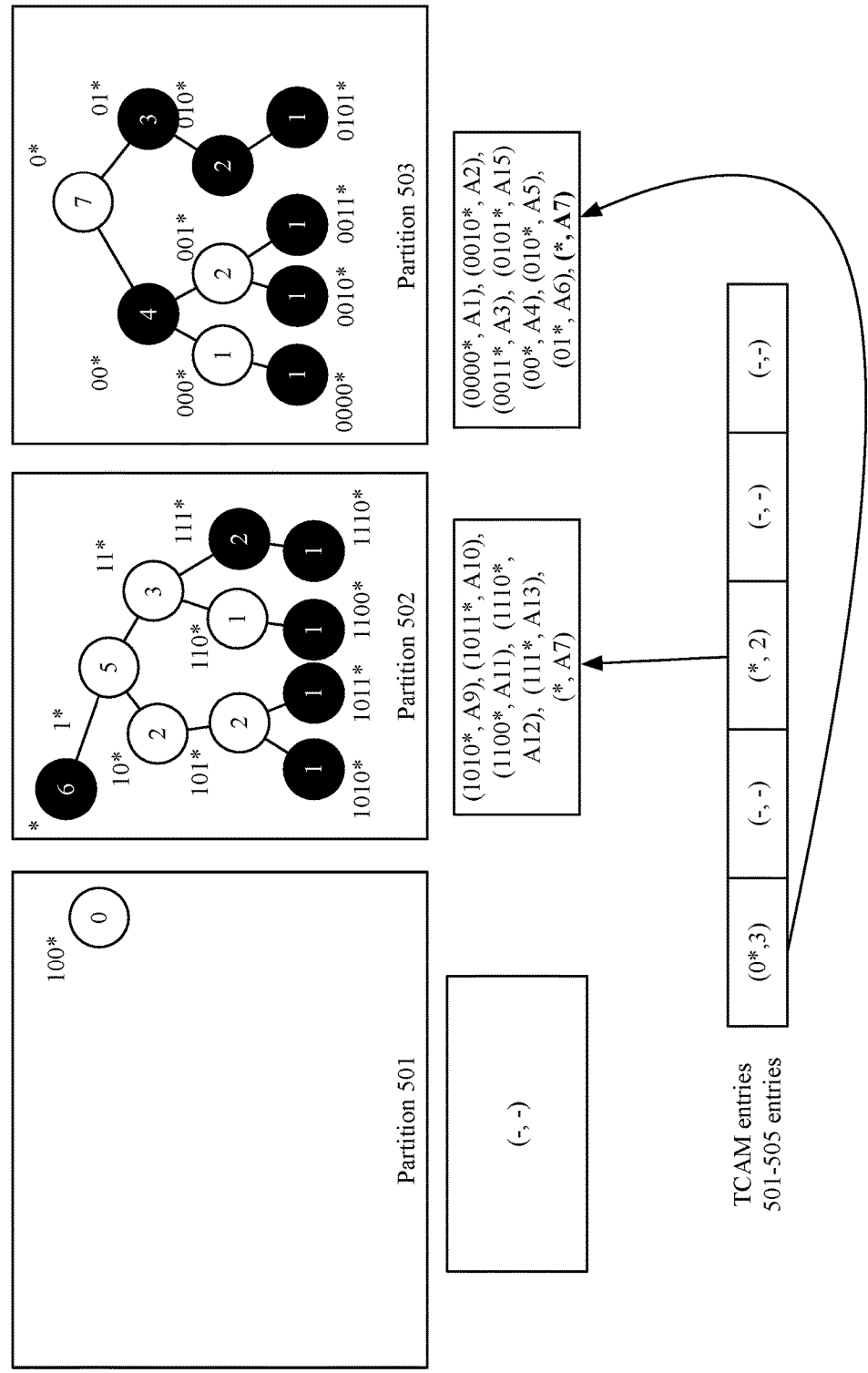
Figure 12:
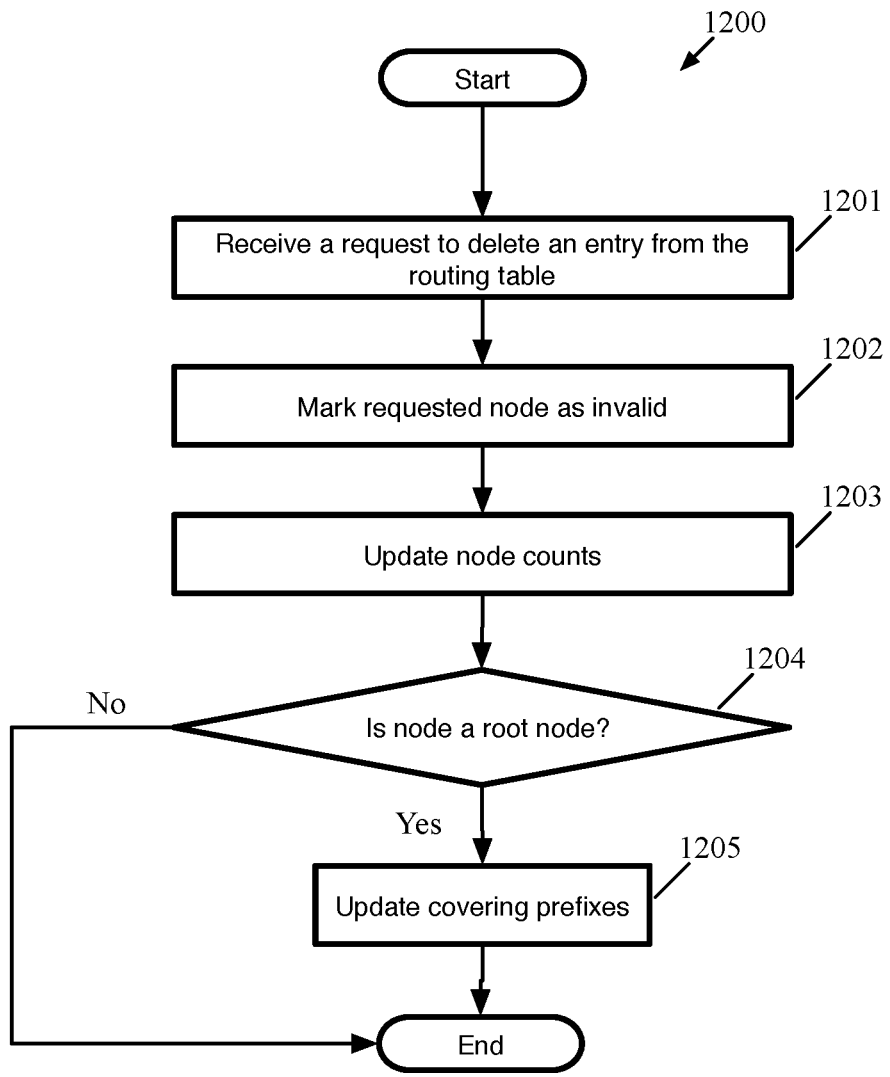
FIG. 12 conceptually illustrates a process for deleting entries from a routing trie.

FIG. 12 conceptually illustrates a process 1200 for deleting entries from the routing trie. Process 1200 is described in relation to FIGS. 11C-D. Process 1200 begins by receiving (at 1201) a request to delete an entry from the routing table. FIG. 11C depicts two requests 1110 and 1120 for deleting entries for "100*" and "0*" respectively. Requests to delete entries, in some embodiments, are received based on a withdrawal of a route by a forwarding element (e.g. a router, switch, bridge, etc.). In some embodiments, the request to delete the entry is based on the termination of a virtual machine associated with the entry to be deleted.

The process continues by marking (at 1202) the requested node as invalid. As depicted in FIG. 11D, nodes "100*" and "0*" are now white instead of black indicating that the nodes are invalid. As part of marking a node invalid the process may remove the routing entry from the partition in which it is stored and remove any pointers to the node from the second type of memory (e.g., TCAM) as in FIG. 11D. the process then updates (at 1203) the node counts for nodes in a same subtree as the node that was the subject of the deletion request for subsequent rearrangement operations. FIG. 11D illustrates that node "100*" has a count of 0 after updating and that node "0*" has a count of 7 after updating. FIG. 11D illustrates that subtree rooted at node "100*" is the root of an empty subtree after marking the node as invalid in an otherwise empty partition, the partition is now ready to be used as an empty partition for subsequent rearrangement operations.

The process then determines (at 1204) if the deleted entry is for a root node. In some embodiments a root node is identified by a root flag (e.g., a bit associated with a node that can be toggled for root and non-root nodes). In the case of a non-root node being deleted, there are no further actions required as the pointer in the second type of memory (e.g., one of TCAM entries 501-505) does not need to be updated and the entry has been removed from the partition. Therefore, if the process determines (at 1204) that the deleted entry is not for a root node, the process ends.

If the process determines (at 1204) that the deleted entry is for a root node, the process then updates (at 1205) the covering node for the root node stored in the partition storing the subtree rooted at the deleted (invalid) node. Updating the covering prefix may be done differently for different types of root nodes. For a root node that is the root node of a subtree including other valid nodes, the entry for a covering prefix is added to the partition in place of the entry for the deleted node. For example, FIG. 11D depicts that the entries in partition 503 include "(*, A7)" instead of "(0*, A14)" after deleting the entry for "*0" from the routing trie and partition.

For a root node that was the only valid node in its subtree, the root node may be merged with a child subtree to form a new subtree rooted at the deleted node or is simply removed from the first memory type (e.g., SRAM) and the second memory type (e.g., the TCAM no longer stores a pointer for the deleted root node). In some embodiments, only a merger that does not require a rearrangement operation is performed. To merge a deleted node with a child subtree without a rearrangement operation, a child subtree is located that is either (1) rooted at an invalid node (i.e., the partition includes a covering prefix for the subtree) or (2) stored in a partition with space for at least one additional entry. Either of these conditions allows the covering prefix of the deleted node to be added, in the first case, to replace the current covering node of the child subtree, and in the second case, as a new entry in the partition. Alternatively, if an appropriate child subtree cannot be found, the entry for the deleted node is simply deleted. For example, in FIG. 11D, the entry for "100*" is deleted from the partition 501 and there is no child subtree with which it can be merged. The deleted node can also be removed from the routing trie if there are no child subtree as in FIG. 11D for node "100*".

In either case (merging or deletion) the second memory type is updated so that the pointer for the prefix of the deleted root node (and merged root node) in the second memory type reflects the current configuration (e.g., root node is no longer valid, root node in second memory type points to partition of merged subtree and root node of merged child is removed from second memory type). While it is not absolutely necessary to delete the entry in the second memory type for the merged child subtree, in some embodiments, changing a root node flag causes the second memory type to remove the entry. The process then ends.

After the different memory types (e.g., SRAMs and TCAMs) have been populated with the routing table and pointers during process 400, the switch is ready to process packets through a series of match action units described above in relation to FIG. 2. FIG. 13 conceptually illustrates a process 1300 for using the memories programmed through process 400 and maintained through processes 600, 800, 1000, and 1200. FIG. 14 illustrates a simplified view of a series of match action stages implementing process 1300.

Process 1300 begins (at 1305) when the switch receives a data message. For example, FIG. 14 illustrates a packet header vector that includes a prefix beginning with 0101. The data message, in some embodiments, includes a set of header values that includes a field corresponding to the addresses in the routing table (e.g., packet header vector "PHV" 1410). Referring to FIG. 1, a parser 120, in some embodiments, extracts the data relevant to the particular field that corresponds to the addresses in the routing table. In some embodiments, as discussed in relation to FIG. 3, the extracted values from the field corresponding to the addresses in the routing table is concatenated with other values and placed at the beginning of the packet header vector so as to perform the LPM.

The process then performs a search (at 1310) in the second memory type (e.g., TCAM) to identify a partition of the first memory type associated with the address (or header field value) of the data message. For example, FIG. 14 illustrates that match-action stage 1401 includes a set of TCAM entries 501-505 (as described in relation to FIG. 5) that are matched with entries in the TCAM for "0*" and "*". In embodiments using a TCAM, the TCAM is searched for the longest prefix matching an entry in the TCAM using a search including wildcard values in the entries in the TCAM. As shown in FIG. 14, multiple TCAM entries (e.g., TCAM entries 501 and 503 for "0*" and "*") may match a given address, but the longest matching prefix (e.g., "0*") will be identified as the longest matching prefix. Once the longest prefix is identified in the TCAM (e.g., "0*" in FIG. 14), the location of the longest prefix in the TCAM indicates a partition to search to find the longest prefix match in the routing table (e.g., SRAM partition 501 in FIG. 14). In some embodiments, the TCAM indicates the partition through a pointer stored at the location of the prefix stored in the TCAM. In some embodiments, the partition is indicated in the output packet header vector of the MAU stage including the TCAM by altering the PHV (e.g., PHV 1410 is altered to form PHV' 1420) to identify the partition.

The process searches (at 1315) the partition of the first memory type (e.g., SRAM) that was identified (at 1310) by the search of the second memory type (e.g., TCAM) to identify a longest matching prefix in the identified partition. For example, FIG. 14 shows SRAM partition 501 being searched based on the TCAM entries identifying it as the partition storing the subtree with the longest matching prefix (i.e., the subtree with root node "0*"). The search of the SRAM, in some embodiments, is performed through a series of exact match searches using a mask particular to each prefix stored in the partition. For example, the prefix 0101 . . . might be searched by applying a mask that makes all non-specified (indicated by "*") trailing bits equivalent or that causes only the first specified bits to be compared. More details about using indexes and masks can be found in U.S. patent application Ser. No. 15/094,914 which is hereby incorporated by reference. In some embodiments, searching the partition includes searching all entries in the partition including both the entries in the subtree of the root node address identified in the first search as well as additional entries that are not in the subtree (e.g., address in other subtrees stored in the partition and any covering nodes stored in the partition). In embodiments in which the first and second type of memory are parts of different stages of a multi-stage data message processor, the only requirement is that the second type of memory be searched in a stage prior to the search of the first type of memory so as to identify the partition in the first type of memory before searching the first type of memory.

The process then identifies (at 1320) a rule that applies to the longest matching prefix and applies the rule to the data message. For example, FIG. 14 illustrates rule A5 being identified as associated with prefix "010*" which is the longest matching prefix stored in partition 501. In some embodiments, the node of the subtree identified as the longest matching prefix is associated with a rule stored in the partition. In other embodiments, a node stores a pointer to another data structure storing rules that is then accessed, and the identified rule is applied to a data message. In some embodiments, the rule identifies an action associated with the longest prefix match that is then carried out. The identified action, in some embodiments, is one of forwarding the data message to a next hop address, dropping or allowing the data message, encapsulating the data message, etc.

As an alternative to ALPM described above in relation to FIGS. 4-13, the switch architecture described in relation to FIG. 1 supports a chained longest prefix matching (CLPM) that makes use of more SRAMs and uses less or no TCAMs. This is in contrast to a standard switch, which has a fixed LPM pipeline that uses a single large TCAM or a specific configuration of TCAMs and SRAMs. FIG. 15 conceptually illustrates a process 1500 for configuring a switch to perform a longest prefix matching operation using a set of exact-match tables that can be implemented in SRAM. In some embodiments, a non-exact-match table is implemented in TCAM to ensure that there are no holes in the routing table. In some embodiments, process 1500 is performed by a controller of a switch. Process 1500, in some embodiments, is based on a program that is compiled to be implemented using a particular switch architecture. FIG. 16 conceptually illustrates a logical view 1600 of a CLPM operation in which tables for longest prefix matches are searched sequentially and an exemplary series of match-action stages configured by process 1500 in some embodiments to implement the CLPM operation. The program is provided by a user in some embodiments.

Process 1500 begins by allocating (at 1505) a set of exact-match LPM tables to be populated by routing entries with specific prefix lengths (e.g., tables 1604-1609 in FIG. 16). In some embodiments, the space allocated for each table in the set of exact-match tables is based on a prior knowledge of the prefix distribution for the network. In some embodiments, the user provides the table sizes for each prefix length in a program written in a high level language (e.g., P4). In some embodiments, a user specifies the type of memory table (exact-match or non-exact-match) for each prefix length (or set of prefix lengths for a non-exact-match table). If the type of memory table is unspecified, in some embodiments, a compiler determines the type of memory for each prefix length. In some embodiments, the compiler implements a preference for storing contiguous prefix lengths in a non-exact-match table if possible (e.g., if the contiguous prefix lengths have less than a threshold number of allocated entries).

FIG. 16 illustrates a set of exact-match tables 1604-1608 and 1610 wherein the different sizes represents the different amount of memory space. Allocating the set of exact-match tables, in some embodiments, includes allocating exact-match tables for each possible prefix length (e.g., from /0 to /32 addresses). FIG. 16 includes a set of exact-match tables stored in separate stages of a switch's processing pipeline. Exact-match tables stored in each stage of a switch processing pipeline, in some embodiments, are for prefix lengths that are longer than prefix lengths of exact-match tables that are stored in subsequent stages of the switch processing pipeline. For example, FIG. 16 illustrates a first set of exact-match tables in a first stage 1601 for address prefix lengths of 32-, 31-, and 30-bits while a subsequent stage 1602 includes exact-match tables for address prefix lengths of 29- and 28-bits. Such an ordering allows shorter-prefix-length exact-match tables that are stored in later stages to remain unsearched if an exact match is found in an exact-match table stored in a prior stage. If multiple exact-match tables are allocated in a single stage of a multi-stage switch processing pipeline, each exact-match table is associated with a priority. In some embodiments in which all tables are searched for matches, all tables are associated with a priority. In some embodiments, the priority is based on the length of the prefixes stored in the table and the highest priority table is the one with the longest prefix length.

The process continues by allocating (at 1510) a set of non-exact-match LPM tables to be populated by routing entries with a plurality of prefix lengths (e.g., a single table for 0-8 bit prefix lengths (/0 to /8 addresses), or a set of tables for /0-/8, /9-/16, and /17-/22 addresses). FIG. 16 illustrates two non-exact-match tables 1609 and 1611. In some embodiments, the non-exact match tables are implemented (stored) in ternary content addressable memory (TCAM) to allow for a search over the different prefix lengths using the wildcard, or "don't care," value for certain bits stored in the TCAM. The set of non-exact match tables are used, in some embodiments, to account for a range of prefix lengths that are not expected to be populated with routing entries based on the prior knowledge of the network. In some embodiments, a decision to use a non-exact-match table for a set of prefix lengths is determined by a control circuit based on the space allocated for the set of prefixes (e.g., a set of prefixes that uses less than 100 entries each is combined in a single non-exact-match table). A logical construct provided by a user in a program, in some embodiments, is translated (or mapped) to the physical construct in the data plane (e.g., data circuit) by the control plane (e.g., control circuit). In some embodiments, all exact-match and non-exact-match tables are stored in a single stage of the multi-stage switch processing pipeline. Non-exact-match tables, in some embodiments, are used to ensure that there are no holes in the address space. In some embodiments, the set of non-exact-match LPM tables is empty as each prefix length is provided with a separate exact match table.

The process continues by populating (at 1515) the different allocated tables with routing entries. In some embodiments, the routing entries used to populate the tables are from a routing table. Routing entries, in some embodiments, are dynamically added during runtime. Additional routing entries, in some embodiments, are based on route advertisements by elements of the network connected to the switch. Process 1500, in some embodiments, is performed separately for each address field that requires longest prefix matching. The process then ends.

FIG. 17 conceptually illustrates a process 1700 for using exact-match and non-exact-match LPM tables allocated and populated using process 1500. Process 1700 is used by a switch to perform a longest prefix matching operation. Process 1700 begins by receiving (at 1705) a data message. The data message, in some embodiments, has a set of associated addresses (e.g., a destination internet protocol (IP) address, a source IP address, destination media access control (MAC) address, a source MAC address, etc.). In some embodiments, a separate longest prefix matching operation is performed for each of a set of addresses associated with the data message (e.g., a destination IP address and source MAC address, destination and source IP address, etc.).

Process 1700 then performs (at 1710) a search through any LPM tables stored in a current stage of the switch processing pipeline for a LPM for a particular address associated with the received data message. The different stages of the switch processing pipeline each store a set of zero or more exact-match and/or non-exact-match LPM tables (e.g., tables 1604-1606 in stage 1601, exact-match tables 1607 and 1608 and non-exact-match table 1609 in stage 1602, and exact-match table 1610 and non-exact-match table 1611 in stage 1603). As described above, in some embodiments, the LPM tables are distributed among the stages of the switch processing pipeline such that any stage stores LPM tables that are for shorter prefix lengths than all previous stages. Exact-match LPM tables are searched for matches based on a specific prefix length. In some embodiments, this is accomplished using a masking function to mask all bits after the prefix length and then performing an exact match on the unmasked bits (or all the bits with the masked bits matching by definition). Non-exact-match LPM tables are searched, in some embodiments, using the address associated with the received data message and the LPM table entries that allow for wildcard ("don't care") bits.

The process then determines (at 1715) whether a match was found in any of the LPM tables in the current stage. If at least one match is found, the process proceeds to 1720. The process determines (at 1720) the match with the highest priority. If multiple LPM tables are stored in the current stage, an address associated with the received data message may match in multiple LPM tables. The highest priority match is the match in the table that stores the longest prefix (identifying the longest prefix that matches the address associated with the received data message). In some embodiments, the highest priority match is determined based on a priority associated with the stored LPM tables as depicted in FIG. 16.

The process then outputs (at 1725) data associated with the identified longest prefix match. In some embodiments, the output data is an action associated with the matching entry in the LPM table with the highest priority. The action, in some embodiments, is a next-hop MAC address when the switch is performing the LPM operation as part of a routing operation, or a drop or allow action when the switch is using the LPM operation as part of a firewall operation. Other embodiments, use the LPM operation for other functions such as network address translation (NAT), virtual private network (VPN), encapsulation, etc., in which case the actions may be related to a translated address, an encryption parameter, and an encapsulation header, etc. respectively. In some embodiments, the output data is a pointer to a memory location storing the action for the longest matching prefix. The output of a particular stage of a MAU, in some embodiments, takes the form of a modification to a packet header vector (PHV), similar to the modification discussed in relation to FIG. 14, that indicates to the next or subsequent stages the result of the particular stage of the MAU (e.g., a match was found in a particular table, no match was found in any table of the stage, a specific action is to be performed, etc.). The process then ends If the process determines (at 1715) that no match was found in the current stage, the process proceeds to the next stage of the switch's processing pipeline and returns to 1710 and searches the now-current stage for a match in the LPM tables stored in the now-current stage. The process, in some embodiments, continues to search subsequent stages as long as a match has not been found and the final stage has not been reached. In some embodiments, a default match (e.g., a /0 route with no matching bits) is defined such that no LPM operation can fail to find a match.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
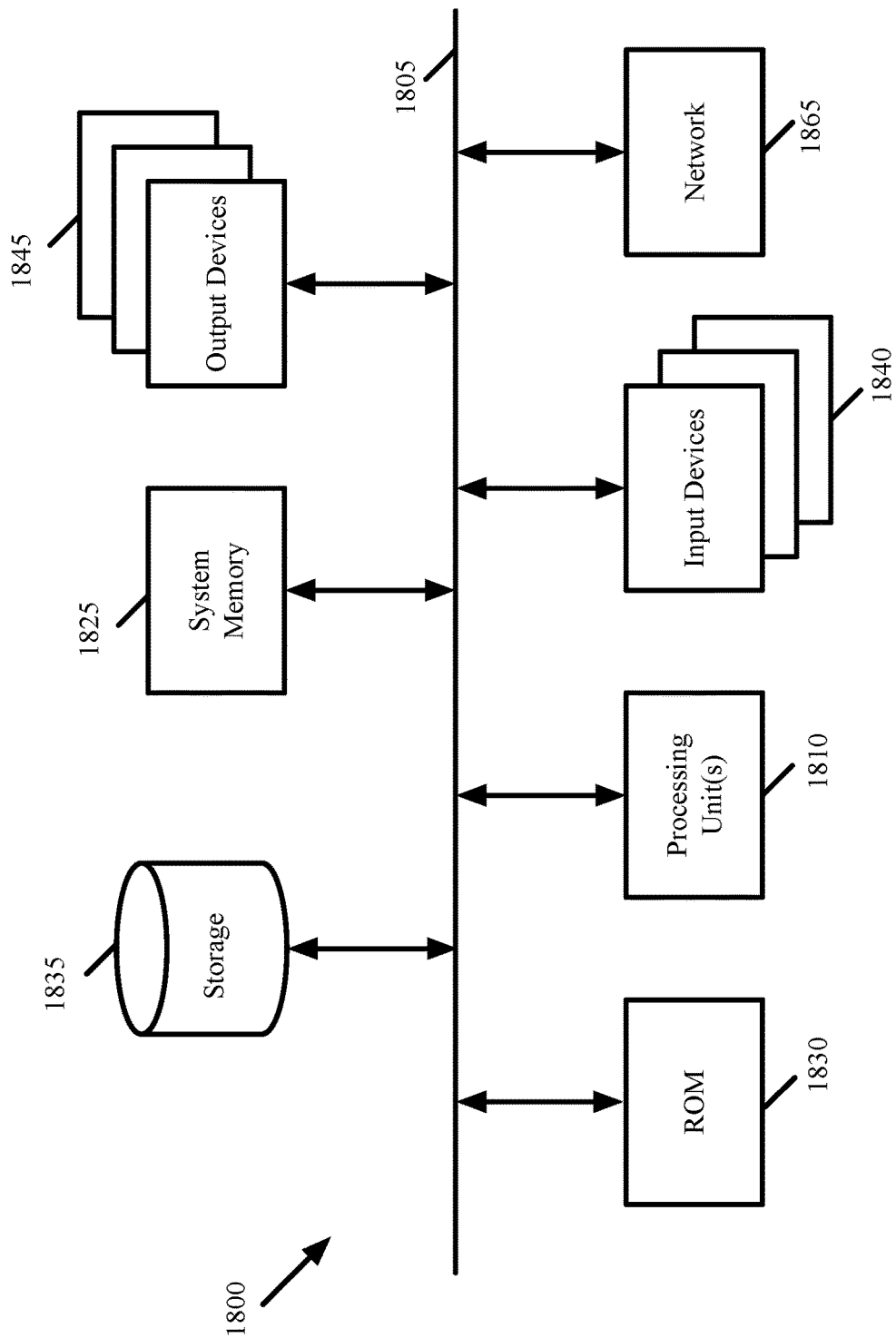
FIG. 18 conceptually illustrates an electronic system with which some embodiments of the invention are implemented.

FIG. 18 conceptually illustrates an electronic system 1800 with which some embodiments of the invention are implemented. The electronic system 1800 can be used to execute any of the control, virtualization, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1825, and the permanent storage device 1835.

From these various unit memories, the processing unit(s) 1810 retrieve instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile unit memory that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various unit memories, the processing unit(s) 1810 retrieve instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 6, 8, 10, 15, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a network forwarding element, a data plane circuit comprising:
    a plurality of data processing stages to process data tuples associated with data messages received by the network forwarding element in order to transmit data messages to a network; and
    a plurality of exact-match longest prefix matching (LPM) tables stored in at least two of the plurality of data processing stages to perform an LPM operation, the exact match LPM tables to store routing table entries, any exact-match table in a first stage in the plurality of stages to store routing table entries with prefix lengths that are longer than the entries stored in any exact-match table in a subsequent, second stage.

2. The data plane circuit of claim 1 further comprising:
    a set of non-exact-match tables, at least one non-exact-match table to store routing table entries of a plurality of prefix lengths.

3. The data plane circuit of claim 2, wherein at least one exact match table is stored in a first type of memory and at least one non-exact match table is stored in a second type of memory.

4. The data plane circuit of claim 3, wherein the first type of memory comprises static random access memory (SRAM) and the second type of memory comprises ternary content addressable memory (TCAM).

5. The data plane circuit of claim 1, wherein all exact-match tables at each stage store routing table entries with a shorter prefix length than all exact-match tables searched as part of the longest prefix matching operation in all previous stages.

6. The data plane circuit of claim 5, wherein at least one stage has a plurality of exact-match tables for a plurality of prefix lengths.

7. The data plane circuit of claim 6, wherein the exact-match tables in a same stage of the longest prefix matching operation are associated with a priority, the priority of a particular exact-match table based on a prefix length of the exact-match table with higher priorities associated with longer prefixes.

8. The data plane circuit of claim 7, wherein the output of a particular stage of the longest prefix matching operation that finds an exact match in any of the exact-match tables of the particular stage is based on the match found in the exact-match table with the highest priority.

9. The data plane circuit of claim 1, wherein a finding of an exact match in a first stage's exact-match table is to cause a subsequent stage's exact match tables to not be searched.

10. The data plane circuit of claim 1, wherein the exact-match routing tables sizes are allocated based on a prior knowledge of prefix distribution in a network.

11. A network forwarding element comprising:
    a connection to a data plane circuit and
    a control plane circuit coupled to the connection, the control plane circuit to configure a data plane circuit of the network forwarding element to store a plurality of exact-match longest prefix matching (LPM) tables that store routing table entries, wherein the data plane circuit comprises a plurality of data processing stages to process data tuples associated with data messages received by the forwarding element in order to transmit data messages in a network, and the exact-match tables are stored in at least two of the plurality of data processing stages to perform an LPM operation, any exact-match table in a first stage in the plurality of stages storing routing table entries with prefix lengths that are longer than the entries stored in any exact-match table in a subsequent, second stage.

12. The network forwarding element of claim 11, wherein the control plane circuit further is to configure the data plane circuit of the network forwarding element to store a set of non-exact-match tables, at least one non-exact-match table to store routing table entries of a plurality of prefix lengths.

13. The network forwarding element of claim 12, wherein at least one of the plurality of exact-match tables and at least one of the plurality of non-exact-match tables are stored in one data processing stage of the plurality of data processing stages of the data plane circuit.

14. The network forwarding element of claim 12, wherein at least one exact match table is stored in a first type of memory and at least one non-exact match table is stored in a second type of memory.

15. The network forwarding element of claim 14, wherein the first type of memory comprises static random access memory (SRAM) and the second type of memory comprises ternary content addressable memory (TCAM).

16. The network forwarding element of claim 11, wherein all exact-match tables at each stage store routing table entries with a shorter prefix length than all exact-match tables searched as part of the longest prefix matching operation in all previous stages.

17. The network forwarding element of claim 16, wherein at least one stage has a plurality of exact-match tables for a plurality of prefix lengths, the exact-match tables in a same stage of the longest prefix matching operation associated with a priority, the priority of a particular exact-match table based on a prefix length of the exact-match table with higher priorities associated with longer prefixes.

18. The network forwarding element of claim 17, wherein the output of a particular stage of the longest prefix matching operation that finds an exact match in any of the exact-match tables of the particular stage is based on the match found in the exact-match table with the highest priority.

19. A method comprising:
  processing data tuples associated with received data messages to transmit data messages to a network; and
  perform at least a longest prefix matching (LPM) operation using one or more exact-match LPM tables, wherein:
    the LPM tables are stored in at least two of a plurality of data processing stages,
    the LPM tables are to store routing table entries, and
    an exact-match table in a first stage in the plurality of stages storing routing table entries with prefix lengths that are longer than the entries stored in any exact-match table in a subsequent, second stage.

* * * * *